(12) United States Patent
Tanaka

(10) Patent No.: US 12,308,994 B2
(45) Date of Patent: May 20, 2025

(54) VEHICLE PLATFORM, VEHICLE CONTROL INTERFACE BOX, AND AUTONOMOUS DRIVING SYSTEM

(71) Applicant: TOYOTA JIDOSHA KABUSHIKI KAISHA, Toyota (JP)

(72) Inventor: Go Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 450 days.

(21) Appl. No.: 17/890,935

(22) Filed: Aug. 18, 2022

(65) Prior Publication Data

US 2023/0148076 A1  May 11, 2023

(30) Foreign Application Priority Data

Nov. 11, 2021 (JP) ................................. 2021-183956

(51) Int. Cl.
*H04L 12/40* (2006.01)
*B60W 60/00* (2020.01)

(52) U.S. Cl.
CPC ............ *H04L 12/40* (2013.01); *B60W 60/001* (2020.02); *H04L 2012/40215* (2013.01); *H04L 2012/40273* (2013.01)

(58) Field of Classification Search
CPC ........... H04L 12/40; H04L 2012/40215; H04L 2012/40273; H04L 12/40143; H04L 12/46; B60W 60/001; B60W 60/00; B60W 50/00; B60W 2050/0002; B60W 2050/0005; B60W 2050/0043

See application file for complete search history.

(56) References Cited

U.S. PATENT DOCUMENTS

| | | | |
|---|---|---|---|
| 2005/0027404 A1* | 2/2005 | Ban ....................... | B60W 50/00 701/1 |
| 2018/0126930 A1 | 5/2018 | Ando et al. | |
| 2018/0152364 A1* | 5/2018 | Lee ......................... | H04L 12/40 |
| 2018/0176305 A1* | 6/2018 | Omori .................... | H04L 67/12 |
| 2020/0409362 A1* | 12/2020 | Long .................... | B60W 50/14 |
| 2021/0027625 A1 | 1/2021 | Jung et al. | |
| 2021/0237765 A1 | 8/2021 | Ando | |
| 2022/0274612 A1 | 9/2022 | Kurokawa et al. | |

FOREIGN PATENT DOCUMENTS

| | | |
|---|---|---|
| JP | 2012-178035 A | 9/2012 |
| JP | 2018-070121 A | 5/2018 |
| JP | 2018-132015 A | 8/2018 |
| JP | 2019-213163 A | 12/2019 |
| JP | 2021-018744 A | 2/2021 |
| JP | 2021-027387 A | 2/2021 |
| JP | 2021-123135 A | 8/2021 |
| WO | 2012/114194 A1 | 8/2012 |

\* cited by examiner

*Primary Examiner* — Steven Hieu D Nguyen
(74) *Attorney, Agent, or Firm* — Oliff PLC

(57) ABSTRACT

A VP is configured such that an ADS is installable in the VP. The VP includes a base vehicle and a VCIB. The VCIB acts as an interface between the base vehicle and the ADS by CAN communication. The VCIB includes a reception unit, an index value calculation unit, and a transmission unit. The reception unit receives a control request for the base vehicle from the ADS. The index value calculation unit calculates an index value showing a degree of congestion of the CAN communication. The transmission unit transmits the index value to the ADS.

9 Claims, 10 Drawing Sheets

FIG. 3

| LABEL | SIGNAL CONTENTS | DEGREE OF PRIORITY | TRANS-MISSION CYCLE | DATA SIZE | OFFSET |
|---|---|---|---|---|---|
| \[INFORMATION ON SIGNALS TRANSMITTED FROM ADK TO VCIB\] 212 ||||||
| A1-1 | DRIVE CONTROL | HIGH | Ta1-1 | Sa1-1 | Oa1-1 |
| A2-1 | WIPER CONTROL | LOW | Ta2-1 | Sa2-1 | Oa2-1 |
| ⋮ | ⋮ | ⋮ | ⋮ | ⋮ | ⋮ |

FIG. 4

[DATA ON PLAN OF RECEPTION FROM ADS] DRC1  432

| LABEL | SIGNAL CONTENTS | DESIGNED RECEPTION CYCLE | DATA SIZE |
|---|---|---|---|
| A1-1 | DRIVE CONTROL | Ta1-10 | Sa1-1 |
| A2-1 | WIPER CONTROL | Ta2-10 | Sa2-1 |
| ⋮ | ⋮ | ⋮ | ⋮ |

[DATA ON PLAN OF TRANSMISSION TO BASE VEHICLE] OI1  433

| LABEL | SIGNAL CONTENTS | TRANSMISSION CYCLE | DATA SIZE | OFFSET |
|---|---|---|---|---|
| B1-1 | DRIVE CONTROL | Tb1-10 | Sb1-1 | Ob1-1 |
| B2-1 | WIPER CONTROL | Tb2-10 | Sb2-1 | Ob2-1 |
| ⋮ | ⋮ | ⋮ | ⋮ | ⋮ |

[DATA ON PLAN OF RECEPTION FROM BASE VEHICLE]  434
DRC2

| LABEL | SIGNAL CONTENTS | DESIGNED RECEPTION CYCLE | DATA SIZE |
|---|---|---|---|
| C1-1 | VEHICLE MOVING DIRECTION | Tc1-1 | Sc1-1 |
| ⋮ | ⋮ | ⋮ | ⋮ |

[DATA ON PLAN OF TRANSMISSION TO ADS] OI2  435

| LABEL | SIGNAL CONTENTS | TRANSMISSION CYCLE | DATA SIZE | OFFSET |
|---|---|---|---|---|
| D1-1 | VEHICLE MOVING DIRECTION | Td1-1 | Sd1-1 | Od1-1 |
| ⋮ | ⋮ | ⋮ | ⋮ | ⋮ |

111(430)

FIG. 7  COMPARATIVE EXAMPLE

EMBODIMENT 2

VEHICLE PLATFORM, VEHICLE CONTROL INTERFACE BOX, AND AUTONOMOUS DRIVING SYSTEM

CROSS-REFERENCE TO RELATED APPLICATION

This application claims priority to Japanese Patent Application No. 2021-183956 filed on Nov. 11, 2021, incorporated herein by reference in its entirety.

BACKGROUND

1. Technical Field

This disclosure relates to a vehicle platform configured such that an autonomous driving system is installable in the vehicle platform, a vehicle control interface box that acts as an interface between a vehicle platform and an autonomous driving system installed in the vehicle platform, and an autonomous driving system configured to be installable in a vehicle platform.

2. Description of Related Art

Japanese Unexamined Patent Application Publication No. 2018-132015 (JP 2018-132015 A) discloses a vehicle equipped with an autonomous driving system. This vehicle is equipped with a motive power system, a power source system, and the autonomous driving system. The motive power system integrally manages motive power in the vehicle. The power source system integrally manages, for example, charging and discharging electricity of a battery mounted in the vehicle and electricity supply to various on-board devices. The autonomous driving system integrally executes autonomous driving control of the vehicle. An engine electronic control unit (ECU) of the motive power system, a power source ECU of the power source system, and an autonomous driving ECU of the autonomous driving system are communicably connected to one another through an on-board network (see JP 2018-132015 A).

SUMMARY

It is conceivable to retrofit a vehicle with an autonomous driving system developed by an autonomous driving system company. In this case, autonomous driving is realized as vehicle control is executed according to control requests from the added autonomous driving system to the vehicle.

In such a vehicle, an interface for various instructions and signals exchanged between the added autonomous driving system and the vehicle is important. A controller area network (CAN) communication is sometimes used for such an interface.

When CAN communication becomes congested, a situation can arise where the various instructions and signals fail to be appropriately transmitted to the vehicle through the interface. Since the added autonomous driving system is not built in the vehicle, the system may not be able to detect this situation. Therefore, also after CAN communication becomes congested, the autonomous driving system may continue to output control requests as before CAN communication becomes congested, thus leaving the situation unimproved. As a result, autonomous driving of the vehicle may not be appropriately executed according to control requests from the autonomous driving system.

This disclosure has been made to solve this problem, and an object thereof is to make it possible, in a vehicle platform equipped with an autonomous driving system, to appropriately execute autonomous driving according to control requests from the autonomous driving system when CAN communication between a vehicle and the autonomous driving system becomes congested.

Another object of this disclosure is to make it possible, in a vehicle control interface box that acts as an interface between a vehicle platform and an autonomous driving system installed in the vehicle platform, to appropriately execute autonomous driving according to control requests from the autonomous driving system when CAN communication between a vehicle and the autonomous driving system becomes congested.

Another object of this disclosure is to make it possible, in an autonomous driving system installed in a vehicle platform, to appropriately execute autonomous driving according to control requests from the autonomous driving system when CAN communication between a vehicle and the autonomous driving system becomes congested.

A vehicle platform of this disclosure is configured such that an autonomous driving system is installable in the vehicle platform. The vehicle platform includes a vehicle and a vehicle control interface box. The vehicle control interface box acts as an interface between the vehicle and the autonomous driving system installed in the vehicle by CAN communication. The vehicle control interface box includes a first reception unit, a calculation unit, and a first transmission unit. The first reception unit receives a control request for the vehicle from the autonomous driving system. The calculation unit calculates an index value showing a degree of congestion of the CAN communication. The first transmission unit transmits the index value to the autonomous driving system.

By this configuration, the index value is transmitted to the autonomous driving system. Thus, the degree of congestion of the CAN communication can be notified to the autonomous driving system. As a result, autonomous driving of the vehicle can be appropriately executed according to control requests from the autonomous driving system to the vehicle.

The index value may include a first communication delay time and a second communication delay time. The first communication delay time is a delay time in communication from the autonomous driving system to the vehicle through the vehicle control interface box. The second communication delay time is a delay time in communication from the vehicle to the autonomous driving system through the vehicle control interface box.

By this configuration, the delay time in communication between the autonomous driving system and the vehicle is reflected on the index value. As a result, the index value can be appropriately calculated.

Communication lines in which the CAN communication is performed may include a first communication line that connects the autonomous driving system and the vehicle control interface box to each other. The vehicle control interface box may further include a second transmission unit that transmits a control instruction for the vehicle generated based on the control request to the vehicle. The first communication delay time may include a reception delay time and a processing delay time. The reception delay time occurs when the first reception unit receives the control request through the first communication line. The processing delay time occurs in processing during a period from when the first reception unit receives the control request until when the second transmission unit transmits the control instruction.

By this configuration, the reception delay time and the processing delay time of a control request in the CAN communication from the autonomous driving system to the vehicle through the vehicle control interface box are reflected on the index value. As a result, the index value can be more appropriately calculated.

Communication lines in which the CAN communication is performed may include a second communication line that connects the vehicle control interface box and the vehicle to each other. The vehicle control interface box may further include a second reception unit that receives a vehicle state signal showing a state of the vehicle from the vehicle. When the second reception unit receives the vehicle state signal, the first transmission unit may transmit a signal generated based on the vehicle state signal to the autonomous driving system. The second communication delay time may include a reception delay time and a processing delay time. The reception delay time occurs when the second reception unit receives the vehicle state signal through the second communication line. The processing delay time occurs in processing during a period from when the second reception unit receives the vehicle state signal until when the first transmission unit transmits a signal generated based on the vehicle state signal.

By this configuration, the reception delay time and the processing delay time of a vehicle state signal in the CAN communication from the vehicle to the autonomous driving system through the vehicle control interface box are reflected on the index value. As a result, the index value can be more appropriately calculated.

A vehicle control interface box of this disclosure acts as an interface between a vehicle platform and an autonomous driving system installed in the vehicle platform by CAN communication. The vehicle platform includes a vehicle. The vehicle control interface box includes a first reception unit, a calculation unit, and a first transmission unit. The first reception unit receives a control request for the vehicle from the autonomous driving system. The calculation unit calculates an index value showing a degree of congestion of the CAN communication. The first transmission unit transmits the index value to the autonomous driving system.

The index value may preferably include a first communication delay time and a second communication delay time. The first communication delay time is a delay time in communication from the autonomous driving system to the vehicle through the vehicle control interface box. The second communication delay time is a delay time in communication from the vehicle to the autonomous driving system through the vehicle control interface box.

Communication lines in which the CAN communication is performed may preferably include a first communication line that connects the autonomous driving system and the vehicle control interface box to each other. The vehicle control interface box may further include a second transmission unit that transmits a control instruction for the vehicle generated based on the control request to the vehicle. The first communication delay time may include a reception delay time and a processing delay time. The reception delay time occurs when the first reception unit receives the control request through the first communication line. The processing delay time occurs in processing during a period from when the first reception unit receives the control request until when the second transmission unit transmits the control instruction.

Communication lines in which the CAN communication is performed may preferably include a second communication line that connects the vehicle control interface box and the vehicle to each other. The vehicle control interface box may further include a second reception unit that receives a vehicle state signal showing a state of the vehicle from the vehicle through the second communication line. When the second reception unit receives the vehicle state signal, the first transmission unit may transmit a signal generated based on the vehicle state signal to the autonomous driving system. The second communication delay time may include a reception delay time and a processing delay time. The reception delay time occurs when the second reception unit receives the vehicle state signal. The processing delay time occurs in processing during a period from when the second reception unit receives the vehicle state signal until when the first transmission unit transmits a signal generated based on the vehicle state signal.

An autonomous driving system of this disclosure is configured to be installable in a vehicle platform. The vehicle platform includes a vehicle and a vehicle control interface box. The vehicle control interface box acts as an interface between the vehicle and the autonomous driving system installed in the vehicle by CAN communication. The autonomous driving system includes a computer and a communication module. The communication module performs communication with the vehicle control interface box by the CAN communication. The computer is programmed to: receive an index value showing a degree of congestion of the CAN communication from the vehicle control interface box through the communication module; transmit control requests for the vehicle to the vehicle control interface box through the communication module; and set a transmission plan of the control requests according to degrees of priority of the control requests in the CAN communication and the index value.

By this configuration, the control requests are appropriately transmitted from the autonomous driving system to the vehicle control interface box. Thus, the degree of congestion of the CAN communication is reduced. As a result, autonomous driving of the vehicle can be appropriately executed according to the control requests from the autonomous driving system to the vehicle.

The control requests may be classified into a plurality of groups according to the degree of priority. The plurality of groups may include a first group of which the degree of priority is high and a second group of which the degree of priority is lower than that of the first group. The computer may set the transmission plan such that a transmission cycle of a control request classified into the second group becomes longer when the index value is high than when the index value is low.

The control requests may be classified into a plurality of groups according to the degree of priority. The plurality of groups may include a first group of which the degree of priority is high and a second group of which the degree of priority is lower than that of the first group. The computer may set a transmission waiting time of the control request classified into the second group such that a transmission period of the control request classified into the second group does not overlap with a transmission period of the control request classified into the first group. The computer may set the transmission plan such that the transmission waiting time becomes longer when the index value is high than when the index value is low.

By this configuration, the transmission frequency of control requests classified into the second group becomes lower when the CAN communication is congested than when the CAN communication is not congested. Thus, it is possible to reduce the degree of congestion of the CAN communication while continuing to transmit control requests classified into the first group with a high degree of priority as before the CAN communication becomes congested.

According to this disclosure, autonomous driving can be appropriately executed according to control requests from the autonomous driving system to the vehicle when the CAN communication between the vehicle and the autonomous driving system becomes congested.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing data representing a plan of transmission of CAN signals (control requests) transmitted from the ADS to a VCIB through a CAN communication line;

FIG. 4 is tables showing plans of reception of CAN signals received by the VCIB and plans of transmission of CAN signals transmitted by the VCIB;

DETAILED DESCRIPTION OF EMBODIMENTS

Embodiment 1

Figure 1:
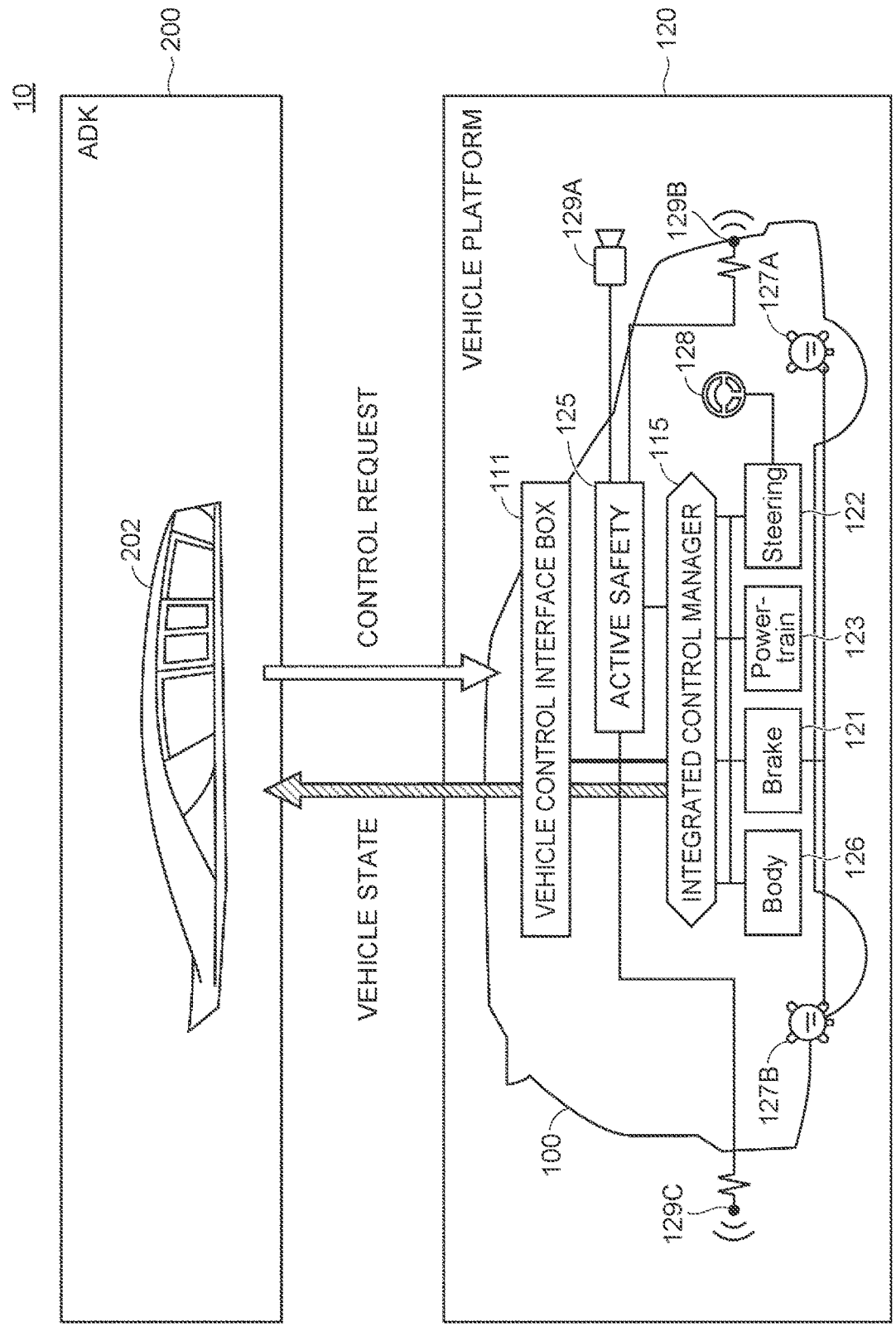
FIG. 1 is a diagram showing an overview of a vehicle according to Embodiment 1.

Embodiment 1 will be described in detail below with reference to the drawings. The same or equivalent parts in the drawings will be denoted by the same reference signs and the description thereof will not be repeated.

FIG. 1 is a diagram showing an overview of a vehicle 10 according to Embodiment 1. Referring to FIG. 1, the vehicle 10 includes an autonomous driving kit (hereinafter referred to as an "ADK") 200 and a vehicle platform (hereinafter referred to as a "VP") 120. The ADK 200 is configured to be mountable to (installable in) the VP 120. The ADK 200 and the VP 120 are configured to be able to communicate with each other through a vehicle control interface box 111 (to be described later) installed in the VP 120.

The VP 120 can perform autonomous driving according to a control request from the ADK 200. In FIG. 1, the VP 120 and the ADK 200 are shown at positions away from each other, but in reality the ADK 200 is mounted to a rooftop etc. of a base vehicle 100 (to be described later) constituting a part of the VP 120. The ADK 200 can also be removed from the VP 120. When the ADK 200 has been removed, the VP 120 can travel by driving of a user. In this case, the VP 120 executes travel control in manual mode (travel control according to the user's operation).

The ADK 200 includes an autonomous driving system (hereinafter referred to as an "ADS") 202 for performing autonomous driving of the vehicle 10. For example, the ADS 202 creates a travel plan of the vehicle 10. The ADS 202 outputs various control requests for causing the vehicle 10 to travel in accordance with the created travel plan to the VP 120 according to an application program interface (API) defined for each request. Further, the ADS 202 receives various signals showing a state of the VP 120 (vehicle state) from the VP 120 according to an API defined for each signal. Then, the ADS 202 reflects the received vehicle state in creating the travel plan. The detailed configuration of the ADS 202 will be described later.

The VP 120 includes the base vehicle 100 and the vehicle control interface box (hereinafter referred to as a "VCIB") 111.

The base vehicle 100 executes various types of vehicle control according to control requests from the ADK 200 (ADS 202). The base vehicle 100 includes various systems and various sensors for controlling the vehicle. Specifically, the base vehicle 100 includes an integrated control manager 115, a brake system 121, a steering system 122, a powertrain system 123, an active safety system 125, a body system 126, wheel speed sensors 127A, 127B, a pinion angle sensor 128, a camera 129A, and radar sensors 129B, 129C.

The integrated control manager 115 includes a processor and a memory, and integrally controls the aforementioned systems involved in the operation of the vehicle (the brake system 121, the steering system 122, the powertrain system 123, the active safety system 125, and the body system 126). Each system includes an ECU.

The brake system 121 is configured to control a braking device provided in each wheel. The braking device includes, for example, a disk brake system (not shown) that operates using an oil pressure adjusted by an actuator.

The wheel speed sensors 127A, 127B are connected to the brake system 121. The wheel speed sensor 127A detects a rotation speed of a front wheel and outputs the detected value to the brake system 121. The wheel speed sensor 127B detects a rotation speed of a rear wheel and outputs the detected value to the brake system 121.

The brake system 121 generates a braking instruction for the braking device according to a predetermined control request (control instruction) that is output from the ADK 200 through the VCIB 111 and the integrated control manager 115. Then, the brake system 121 controls the braking device using the generated braking instruction. The integrated control manager 115 can calculate the speed of the vehicle (vehicle speed) based on the rotation speed of each wheel.

The steering system 122 is configured to control the steering angle of a steering wheel of the vehicle using a steering device. For example, the steering device includes a rack-and-pinion electric power steering (EPS) that can adjust the steering angle by an actuator.

The pinion angle sensor 128 is connected to the steering system 122. The pinion angle sensor 128 detects a rotation angle (pinion angle) of a pinion gear coupled to a rotating shaft of an actuator that constitutes a part of the steering device, and outputs the detected value to the steering system 122.

The steering system 122 generates a steering instruction for the steering device according to a predetermined control request output from the ADK 200 through the VCIB 111 and the integrated control manager 115. The steering system 122 controls the steering device using the generated steering instruction.

The powertrain system 123 controls an electric parking brake (EPB) system provided in at least one of the wheels, a parking lock (P-Lock) system provided in a transmission of the base vehicle 100, and a propulsion system including a shift device for selecting a shift range. The detailed configuration of the powertrain system 123 will be described later using FIG. 2.

The active safety system 125 detects obstacles (pedestrians, bicycles, parked vehicles, utility poles, etc.) on a front side and a rear side of the vehicle using the camera 129A and the radar sensors 129B, 129C. The active safety system 125 determines whether there is a possibility that the vehicle 10 may collide with an obstacle based on a distance between the vehicle 10 and the obstacle and a moving direction of the vehicle 10. When it is determined that there is a possibility of a collision, the active safety system 125 outputs a braking instruction to the brake system 121 through the integrated control manager 115 so as to increase the braking force of the vehicle.

The body system 126 is configured to control parts including a direction indicator, a horn, and a wiper (none of which is shown) according to, for example, the travel state of the vehicle 10, the environment, etc. The body system 126 controls these parts according to a predetermined control request output from the ADK 200 through the VCIB 111 and the integrated control manager 115.

The VCIB 111 is configured to be able to communicate with the ADS 202 of the ADK 200 through a controller area network (CAN) communication line. The VCIB 111 receives various control requests from the ADS 202 and outputs the state of the VP 120 to the ADS 202 by executing a predetermined API defined for each signal to be communicated. Upon receiving a control request from the ADS 202, the VCIB 111 outputs a control instruction corresponding to the control request to a system corresponding to the control instruction through the integrated control manager 115. Further, the VCIB 111 acquires various pieces of information on the base vehicle 100 from various systems through the integrated control manager 115 and outputs the state of the base vehicle 100 as the vehicle state to the ADS 202.

The vehicle 10 can be used as one of components of a Mobility-as-a-Service (MaaS) system. The MaaS system includes, in addition to the vehicle 10, for example, a data server and a mobility service platform (MSPF) (neither of which is shown).

The MSPF is an integrated platform to which various mobility services are connected. Autonomous driving-related mobility services are connected to the MSPF. Other than autonomous driving-related mobility services, mobility services provided by a ride-sharing company, a car-sharing company, a car rental company, a taxi company, an insurance company, and the like can be connected to the MSPF. Various mobility services including autonomous driving-related mobility services can use a wide variety of functions provided by the MSPF according to the contents of the service by means of APIs that are publicly available in the MSPF.

The VP 120 further includes a data communication module (DCM) (not shown) as a communication interface (I/F) for wirelessly communicating with the data server of the MaaS System. For example, the DCM outputs various pieces of vehicle information, such as the speed, the position, and the autonomous driving state, to the data server. Further, for example, the DCM receives various pieces of data for managing the travel of the autonomous driving vehicles, including the vehicle 10, in an autonomous driving-related mobility service from the mobility service through the MSPF and the data server.

In the MSPF, APIs for using various pieces of data on the vehicle state and vehicle control required to develop an ADK are publicly available. Using the APIs publicly available in the MSPF, various mobility services can use a wide variety of functions provided by the MSPF according to the contents of the service. For example, using an API publicly available in the MSPF, an autonomous driving-related mobility service can acquire driving control data on an autonomous driving vehicle that communicates with the data server, information stored in the data server, etc. from the MSPF. Further, using the API, the autonomous driving-related mobility service can transmit data etc. for managing the autonomous driving vehicles including the vehicle 10 to the MSPF.

Figure 2:
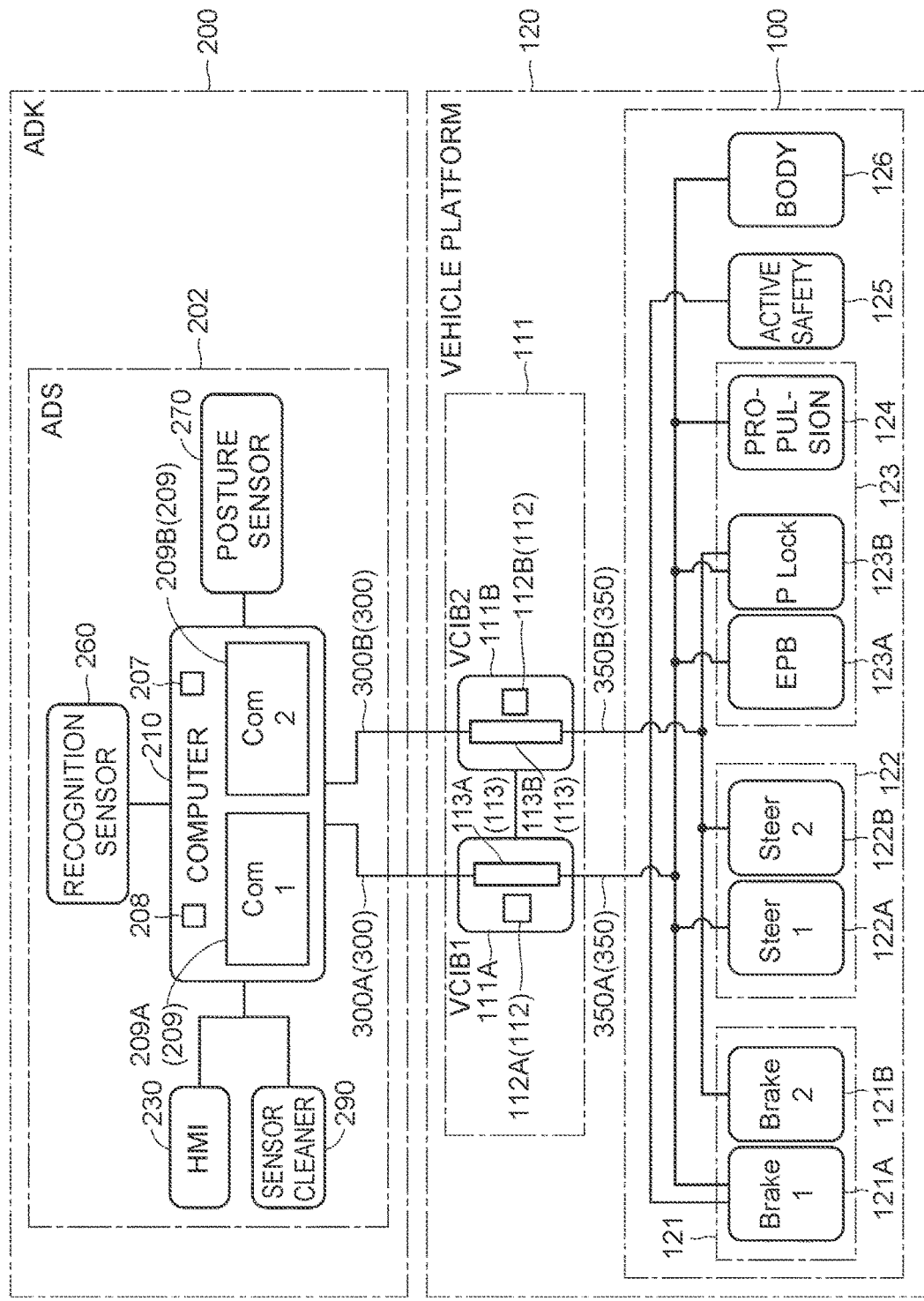
FIG. 2 is a diagram showing the configurations of an ADK (ADS) and a VP shown in FIG. 1 in more detail.

FIG. 2 is a diagram showing the configurations of the ADK 200 (ADS 202) and the VP 120 shown in FIG. 1 in more detail. Referring to FIG. 2, the ADS 202 of the ADK 200 includes a computer 210, a human-machine interface (HMI) 230, a recognition sensor 260, a posture sensor 270, and a sensor cleaner 290.

The computer 210 includes communication modules 209A, 209B, a memory 208, and a processor 207.

The communication modules 209A, 209B are configured to be able to communicate with the VCIB 111. Hereinafter, the communication modules 209A, 209B may be collectively referred to as a "communication module 209." The communication module 209 communicates with the VCIB 111 by CAN communication.

The memory 208 includes, in its configuration, a read-only memory (ROM) and a random-access memory (RAM). The ROM stores data and programs used for processes executed by the processor 207. The RAM functions as a working memory. Specific examples of the data stored in the memory 208 will be described later.

The computer 210 acquires the environment around the vehicle as well as the posture, the behavior, and the position of the vehicle 10 using various sensors (to be described later) during autonomous driving of the vehicle 10, and acquires the vehicle state from the VP 120 via the VCIB 111, and then sets the next action of the vehicle 10 (acceleration, deceleration, turning, etc.). The computer 210 outputs various control requests for realizing the set next action to the VCIB 111 of the VP 120.

The HMI 230 presents information to the user and receives the user's operation during autonomous driving, during driving that requires the user's operation, and during transition between autonomous driving and driving requiring the user's operation. For example, the HMI 230 is configured to be connectable to an input-output device (not shown), such as a touch panel display, provided in the VP 120.

The recognition sensor 260 is a sensor for recognizing the environment around the vehicle. For example, the recognition sensor 260 includes, in its configuration, at least one of a laser imaging detection and ranging (LIDAR), a millimeter-wave radar, and a camera.

The LIDAR is a distance measuring device that emits a laser beam (infrared ray) in pulses and measures a distance based on the time taken for the laser beam to return by reflecting off a target. The millimeter-wave radar is a distance measuring device that measures a distance and a direction of a target by emitting radio waves of short wavelength to the target and detecting radio waves returning from the target. The camera is disposed, for example, on a rear side of a rearview mirror inside a vehicle cabin and used to take images on the front side of the vehicle 10. Image processing using artificial intelligence (AI) or an image processing processor is performed on images and videos taken by the camera to allow recognition of other vehicles, obstacles, persons, etc. present on the front side of the vehicle 10. Information acquired by the recognition sensor 260 is output to the computer 210.

The posture sensor 270 is a sensor for detecting the posture, the behavior, and the position of the vehicle 10. The posture sensor 270 includes, in its configuration, for example, an inertial measurement unit (IMU) and a global positioning system (GPS).

For example, the IMU detects an acceleration rate of the vehicle 10 in a front-rear direction, a left-right direction, and an up-down direction, and an angular speed of the vehicle 10 in a rolling direction, a pitch direction, and a yaw direction. The GPS detects the position of the vehicle 10 using information received from a plurality of GPS satellites circling in orbit around the Earth. Information acquired by the posture sensor 270 is output to the computer 210.

The sensor cleaner 290 is configured to remove contaminants adhering to the various sensors. For example, the sensor cleaner 290 removes contaminants adhering to a lens of the camera, an irradiation unit of laser or radio waves, etc. using a cleaning fluid, a wiper, etc.

The VCIB 111 includes a VCIB 111A and a VCIB 111B. The VCIB 111A includes an ECU 112A and a communication device 113A. The VCIB 111B includes an ECU 112B and a communication device 113B. Each of the ECUs 112A, 112B includes, in its configuration, a processor (not shown), such as a central processing unit (CPU), and memories (a ROM and a RAM; not shown). The ROM stores programs that can be executed by the processor. The processor executes various processes in accordance with programs stored in the ROM. The RAM functions as a working memory. The ECUs 112A, 112B are processing devices that control the VCIBs 111A, 111B, respectively. The communication devices 113A, 113B are configured to communicate with the ADS 202 and the base vehicle 100. The communication devices 113A, 113B operate according to orders from the ECUs 112A, 112B, respectively.

The VCIB 111A is mutually communicably connected to the communication module 209A of the ADS 202 through the communication device 113A and a CAN communication line (CAN bus) 300A. The CAN communication line 300A connects the VCIB 111A and the ADS 202 to each other. The VCIB 111A is mutually communicably connected to the base vehicle 100 through the communication device 113A and a CAN communication line 350A. The CAN communication line 350A connects the VCIB 111A and the base vehicle 100 to each other.

The VCIB 111B is mutually communicably connected to the communication module 209B of the ADS 202 through the communication device 113B and a CAN communication line 300B. The CAN communication line 300B connects the VCIB 111B and the ADS 202 to each other. The VCIB 111B is mutually communicably connected to the base vehicle 100 through the communication device 113B and a CAN communication line 350B. The CAN communication line 350B connects the VCIB 111B and the base vehicle 100 to each other.

Hereinafter, the ECUs 112A, 112B may be collectively referred to as an "ECU 112," and the communication devices 113A, 113B may be collectively referred to as a "communication device 113." The CAN communication lines 300A, 300B may be collectively referred to as a "CAN communication line 300," and the CAN communication lines 350A, 350B may be collectively referred to as a "CAN communication line 350." Signals transmitted through the CAN communication line 300 and the CAN communication line 350 may also be referred to as "CAN signals." The CAN signals correspond to the control requests or control instructions and are mainly used to control the base vehicle 100 or transmit a signal showing the state of the base vehicle 100. The VCIB 111 acts as an interface between the base vehicle 100 and the ADS 202 by CAN communication using the CAN signals.

The VCIB 111A and the VCIB 111B are also mutually communicably connected to each other. Compared with the VCIB 111A, the VCIB 111B has equivalent functions but is connected to partially different systems constituting parts of the VP 120.

Each of the VCIBs 111A, 111B relays a control request and a vehicle state between the ADS 202 and the VP 120. This will be more specifically described using the VCIB 111A as a representative. The VCIB 111A receives various control requests output from the ADS 202 according to an API defined for each control request. Then, the VCIB 111A generates an instruction corresponding to the received control request and outputs the instruction to a system (including the ECU of the system) of the base vehicle 100 that corresponds to the control request. In Embodiment 1, the control requests that the VCIB 111 receives from the ADS 202 include a drive control request, a steering control request, and a power source state control request for the base vehicle 100.

The VCIB 111A receives vehicle information output from each system of the VP 120 through the CAN communication line 350A and transmits information showing the vehicle state of the VP 120 to the ADS 202 according to an API defined for each vehicle state. The information showing the vehicle state that is transmitted to the ADS 202 may be the same information as the vehicle information that is output from each system of the VP 120, or may be information extracted from the vehicle information as information used for a process to be executed in the ADS 202. In Embodiment 1, the vehicle state transmitted to the ADS 202 includes a result of responding to a control request from the ADS 202.

As the VCIB 111A and the VCIB 111B having equivalent functions in relation to the operation of some systems (e.g., braking and steering) are provided, there are redundant control systems between the ADS 202 and the VP 120. Therefore, when some trouble occurs in a part of a system, the functions (turning, stopping, etc.) of the VP 120 can be maintained by, as necessary, switching the control system or shutting down a control system in which the trouble has occurred.

The brake system 121 includes brake systems 121A, 121B. The steering system 122 includes steering systems 122A, 122B. The powertrain system 123 includes an EPB system 123A, a P-Lock system 123B, and a propulsion system 124.

The VCIB 111A and the brake system 121A, the steering system 122A, the EPB system 123A, the P-Lock system 123B, the propulsion system 124, and the body system 126 are mutually communicably connected to each other through the CAN communication line 350A. The VCIB 111B and the brake system 121B, the steering system 122B, and the P-Lock system 123B are mutually communicably connected to each other through the CAN communication line 350B.

Each of the brake systems 121A, 121B is configured to be able to control the braking devices provided in the respective wheels. The brake system 121B may have functions equivalent to those of the brake system 121A. Or one of the brake systems 121A, 121B may be configured to be able to independently control the braking force of each wheel during travel of the vehicle, and the other one may be configured to be able to control the wheels such that the same braking force is generated in each wheel during travel of the vehicle.

Each of the brake systems 121A, 121B generates a braking instruction for the braking device according to a control request received from the ADS 202 through the VCIB 111. For example, the brake systems 121A, 121B control the braking device using a braking instruction generated by one of the brake systems and, when an abnormality occurs in that brake system, control the braking device using a braking instruction generated by the other brake system.

Each of the steering systems 122A, 122B is configured to be able to control the steering angle of the steering wheel of the vehicle 10 using the steering device. Compared with the steering system 122A, the steering system 122B has similar functions.

Each of the steering systems 122A, 122B generates a steering instruction for the steering device according to a control request received from the ADS 202 through the VCIB 111. For example, the steering systems 122A, 122B control the steering device using a steering instruction generated by one of the steering systems and, when an abnormality occurs in that steering system, control the steering device using a steering instruction generated by the other steering system.

The EPB system 123A is configured to be able to control the EPB. The EPB is provided separately from the braking device and fixes the wheels by operation of an actuator. For example, the EPB fixes the wheels by activating a drum brake for parking brake provided in some of the wheels by means of the actuator, or fixes the wheels by activating a braking device by means of an actuator that can adjust an oil pressure supplied to the braking device separately from the brake systems 121A, 121B.

The EPB system 123A controls the EPB according to a control request received from the ADS 202 through the VCIB 111.

The P-Lock system 123B is configured to be able to control a P-Lock device. The P-Lock device engages a protrusion provided at a leading end of a parking lock pawl, of which the position is adjusted by an actuator, with teeth of a gear (lock gear) that is provided so as to be coupled to a rotating element inside the transmission of the base vehicle 100. Thus, an output shaft of the transmission is fixed so as not to rotate, and the wheels are fixed.

The P-Lock system 123B controls the P-Lock device according to a control request received from the ADS 202 through the VCIB 111. The P-Lock system 123B activates the P-Lock device when the control request from the ADS 202 includes a request for moving the shift range to a parking range (P-range), and deactivates the P-Lock device when the control request includes a request for moving the shift range to other range than the P-range.

The propulsion system 124 is configured to be able to switch the shift range using a shift device and control a drive force of the vehicle 10 relative to a moving direction of the vehicle 10 using a drive source. Examples of switchable shift ranges include the P-range, a neutral range (N-range), a forward travel range (D-range), and a rearward travel range (R-range). Examples of the drive source include a motor-generator and an engine.

The propulsion system 124 controls the shift device and the drive source according to a control request received from the ADS 202 through the VCIB 111.

The active safety system 125 is communicably connected to the brake system 121A. As described above, the active safety system 125 detects obstacles etc. (obstacles and persons) on the front side of the vehicle using the camera 129A and the radar sensor 129B and, when it is determined that there is a possibility of a collision based on the distance to an obstacle etc., outputs a braking instruction to the brake system 121A so as to increase the braking force.

The body system 126 controls parts including the direction indicator, the horn, and the wiper according to a control request received from the ADS 202 through the VCIB 111.

In the vehicle 10 having the above-described configuration, autonomous driving is executed when an autonomous mode (autonomous driving mode) is selected as an autonomous state, for example, by the user's operation of the HMI 230. In autonomous driving, the ADS 202 first creates a travel plan as described above. Examples of travel plans include a plan in which the vehicle continues to travel straight forward, a plan in which the vehicle turns left or right at a predetermined intersection at some point on a predetermined travel route, and a plan in which the vehicle changes lanes.

The ADS 202 calculates control-related physical quantities (the acceleration rate, the deceleration rate, the tire turning angle, etc.) required for the vehicle 10 to operate in accordance with the created travel plan. The ADS 202 divides the physical quantity for each execution period of an API. Using the API, the ADS 202 outputs a control request showing the divided physical quantity to the VCIB 111. Further, the ADS 202 acquires the vehicle state (the actual moving direction of the vehicle, the state of the vehicle being fixed, etc.) from the VP 120, and re-creates a travel plan reflecting the acquired vehicle state. In this way, the ADS 202 enables autonomous driving of the vehicle 10.

FIG. 3 is a table showing data representing a plan of transmission of CAN signals (control requests) transmitted from the ADS 202 to the VCIB 111 through the CAN communication line 300.

Referring to FIG. 3, a transmission plan data 212 is stored in the memory 208 of the ADS 202. The transmission plan data 212 includes a label, signal contents, a degree of priority, a transmission cycle, a data size, and an offset.

The label is information for identifying the CAN signal. The label is associated with the signal contents, the degree of priority, the transmission cycle, the data size, and the offset. While two labels are shown in this example, the transmission plan data 212 further includes various pieces of information on CAN signals having other labels.

The signal contents show specific contents of control for which the CAN signal is used. The signal contents are drive control or wiper control of the base vehicle 100 in this example, but are not limited thereto. The transmission plan data 212 further includes various pieces of information on CAN signals having contents different from the contents of the shown three CAN signals (e.g., steering control, collision detection, power source control, air conditioner control, and other contents of control of the base vehicle 100).

The degree of priority shows whether the CAN signal is prioritized compared with other CAN signals. For example, to avoid overlapping of transmission start times of a plurality of CAN signals, the transmission start times of the respective CAN signals are set such that the transmission start time of a CAN signal having a high degree of priority (e.g., 1) precedes the transmission start time of a CAN signal having a low degree of priority (e.g., 0). The degree of priority of the CAN signal for drive control of the base vehicle 100 is higher than the degree of priority of the CAN signal for wiper control of the base vehicle 100.

The control requests for the base vehicle 100 transmitted from the ADS 202 to the VCIB 111 are classified into two groups according to the degree of priority. Specifically, the control requests are classified into a first group having a high degree of priority and a second group having a lower degree of priority than the first group. The control requests may be classified into three or more groups according to the degree of priority. For example, the control requests may be classified into a group of which the degree of priority is "high," a group of which the degree of priority is "medium," and a group of which the degree of priority is "low."

The transmission cycle is a time interval between the transmission start times of one CAN signal and another CAN signal transmitted next to that one among a plurality of CAN signals having the same label. The shorter the transmission cycle of CAN signals, the higher the frequency with which CAN signals are transmitted. Conversely, the longer the transmission cycle, the lower the frequency with which CAN signals are transmitted.

The data size shows the data size of the CAN signal. A CAN signal having a larger data size takes a longer processing time in the ECU 112 when the CAN signal is received by the VCIB 111.

The offset is a shift amount (time interval) by which a transmission period of one CAN signal having one label or a transmission period of another CAN signal having another label is shifted backward in time so as to avoid overlapping of these transmission periods. The transmission period is a period from the transmission start time to the transmission end time. When the offset is determined, the transmission period of the CAN signal is determined. The ADS 202 sets the time of the offset of a control request having a relatively low degree of priority such that the transmission period of the control request having a relatively low degree of priority does not overlap with the transmission period of a control request having a relatively high degree of priority.

FIG. 4 is tables showing plans of reception of CAN signals received by the VCIB 111 and plans of transmission of CAN signals transmitted by the VCIB 111.

Referring to FIG. 4, reception plan data 432, 434 and transmission plan data 433, 435 are assumed to be stored in the memory (storage unit 430) of the VCIB 111.

The reception plan data 432 shows, by label, various pieces of information on CAN signals (control requests) that the VCIB 111 receives from the ADS 202 through the CAN communication line 300. In this example, the various pieces of information are signal contents, the designed reception cycle, and the data size.

In the reception plan data 432, the label, the signal contents, and the data size are the same as those shown in FIG. 3. While two labels are shown in this example, the reception plan data 432 further includes various pieces of information on CAN signals having other labels.

Information showing the designed reception cycle is shown as reception cycle information DRC1. The designed reception cycle is the reception cycle of the control request when the CAN communication line 300 is not congested. In this case, the transmission cycle (FIG. 3) of the control request matches the designed reception cycle. The reception cycle is a time interval between the reception start times of one CAN signal and another CAN signal transmitted next to that one among a plurality of CAN signals having the same label. On the other hand, when the CAN communication line 300 is congested, control requests from the ADS 202 may be pushed on the stack and the VCIB 111 may not be able to adequately execute the reception processing on the control requests. As a result, the actual reception cycle of the control request may become longer than the designed reception cycle.

The transmission plan data 433 shows, by label, various pieces of information on CAN signals (control instructions) that the VCIB 111 transmits to the base vehicle 100 through the CAN communication line 350. In this example, the various pieces of information are the signal contents, the transmission cycle, the data size, and the offset. The information showing an offset is shown as offset information OI1. The control instructions from the VCIB 111 to the base vehicle 100 correspond to the control requests from the ADS 202 to the VCIB 111. Thus, the transmission plan data 433 corresponds to the transmission plan data 212 (FIG. 3).

The reception plan data 434 shows, by label, various pieces of information on CAN signals (vehicle state signals) that the VCIB 111 receives from the base vehicle 100 through the CAN communication line 350. In this example, the various pieces of information are the signal contents, the designed reception cycle, and the data size. As one example of vehicle state signals, a signal showing the moving direction of the base vehicle 100 is shown. Information showing the designed reception cycle is shown as reception cycle information DRC2. The reception plan data 434 further includes various pieces of information about CAN signals having other labels (e.g., signals of which the signal contents show the vehicle speed or the position of the base vehicle 100 or an obstacle around the base vehicle 100).

The transmission plan data 435 shows, by label, various pieces of information on CAN signals that the VCIB 111 transmits to the ADS 202 through the CAN communication line 300. In this example, the various pieces of information are the signal contents, the transmission cycle, the data size, and the offset. Information showing the offset is shown as offset information OI2. The CAN signals transmitted from the VCIB 111 to the ADS 202 correspond to the CAN signals that the VCIB 111 receives from the base vehicle 100. Thus, the transmission plan data 435 corresponds to the reception plan data 434.

Referring to FIG. 2 again, when CAN communication in the CAN communication lines 300, 350 becomes congested, a situation can arise in which control instructions (control requests) are not appropriately transmitted from the ADS 202 to the base vehicle 100 though the VCIB 111. Since the ADS 202 is not built in the base vehicle 100, the ADS 202 may not be able to detect such a situation. Therefore, if, also after CAN communication becomes congested, the ADS 202 continues to output control requests as before CAN communication becomes congested, this situation may remain unimproved. As a result, autonomous driving of the base vehicle 100 may not be appropriately executed according to control requests from the ADS 202.

Therefore, the VCIB 111 according to Embodiment 1 calculates an index value showing the degree of congestion of CAN communication in the CAN communication lines 300, 350 and transmits the index value to the ADS 202.

By this configuration, the index value is transmitted to the ADS 202. Thus, the degree of congestion of CAN communication can be notified to the ADS 202. The ADS 202 is configured to reduce the degree of congestion in the CAN communication line 300 when CAN communication is congested (e.g., when the index value is larger than a threshold value). (This will be described in detail later.) Therefore, after notification to the ADS 202, the degree of congestion of CAN communication between the ADS 202 and the base vehicle 100 can be reduced. As a result, autonomous driving of the base vehicle 100 can be appropriately executed according to control requests from the ADS 202.

Figure 5:
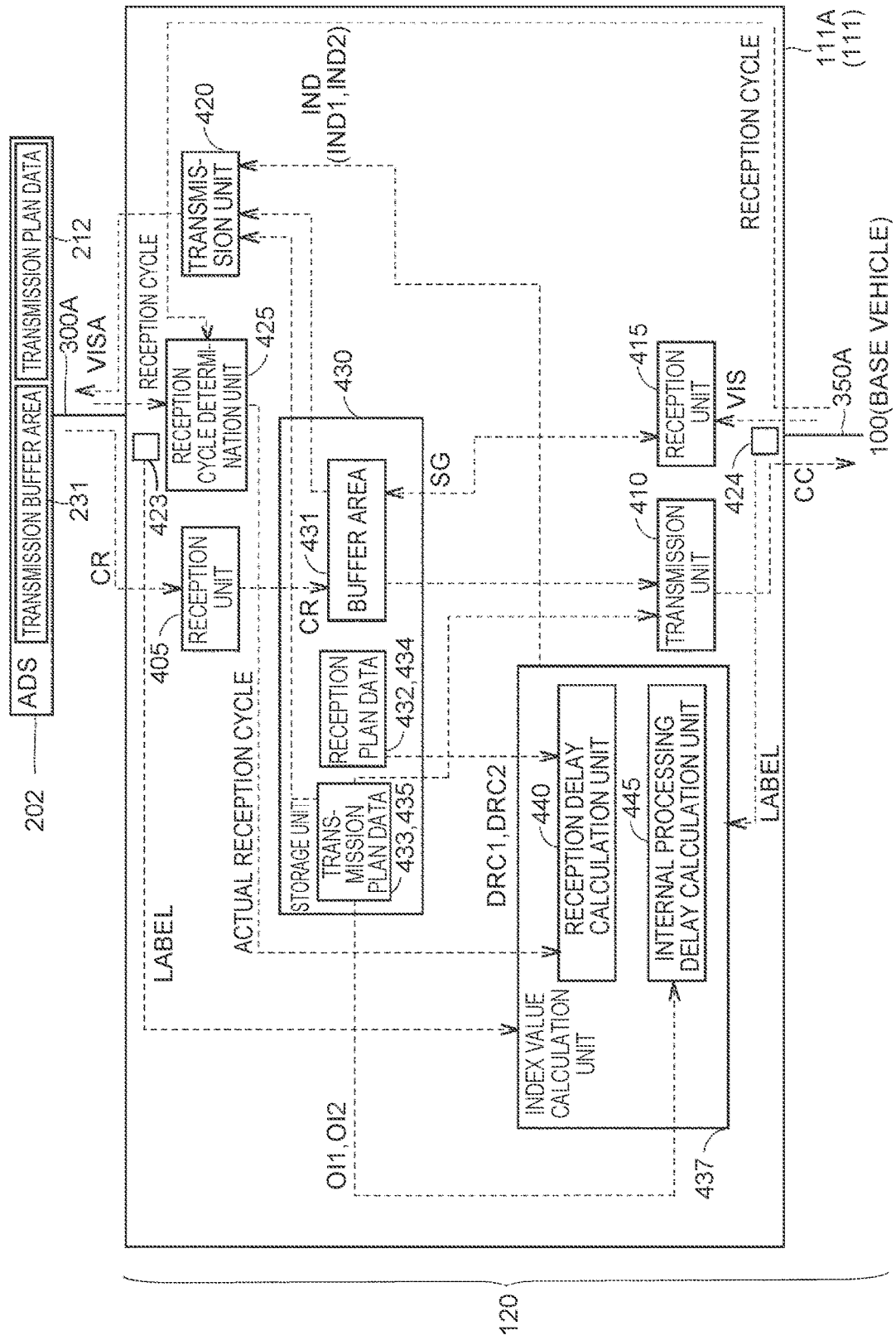
FIG. 5 is a functional block diagram of the VCIB according to Embodiment 1.

FIG. 5 is a functional block diagram of the VCIB 111A according to Embodiment 1. In this example, the functional block diagram of the VCIB 111A is shown as a representative, but the functional block diagram of the VCIB 111B is the same as the functional block diagram of the VCIB 111A except that the CAN communication lines 300A, 350A are replaced with the CAN communication lines 300B, 350B. In the following description, FIG. 4 will be referred to as necessary.

Referring to FIG. 5, the VCIB 111 includes the storage unit 430, a reception unit 405, a transmission unit 410, a reception unit 415, and a transmission unit 420.

The storage unit 430 corresponds to a memory of the VCIB 111. The functions of the reception unit 405, the transmission unit 410, the reception unit 415, and the transmission unit 420 are realized as the ECU 112 of the VCIB 111 and the communication device 113 operate in a collaborative manner. The functions of the reception units 405, 415 and the transmission units 410, 420 may be realized using an API provided by a manufacturer of the VCIB 111.

The reception unit 405 receives a control request CR for the base vehicle 100 from the ADS 202 through the CAN communication line 300A. The control request CR is transmitted from a transmission buffer area 231 (corresponding to the memory 208) of the ADS 202. When received by the reception unit 405, the control request CR is temporarily stored in a buffer area 431 of the storage unit 430 of the VCIB 111.

The transmission unit 410 transmits a control instruction CC for the base vehicle 100 corresponding to the control request CR to the base vehicle 100 through the CAN communication line 350A. The control instruction CC is generated by the transmission unit 410 based on the control request CR. For example, the control instruction CC may be the same as the control request CR or may be generated using information extracted from the control request CR for a process executed in the base vehicle 100. The transmission unit 410 acquires the control request CR from the buffer area 431 and transmits the control instruction CC to the base vehicle 100 according to the transmission plan data 433.

The reception unit 415 receives a vehicle state signal VIS from the base vehicle 100 through the CAN communication line 350A. The vehicle state signal VIS is a CAN signal showing various states of the base vehicle 100, such as the vehicle speed and the moving direction. Vehicle state signals VIS are each allotted a label according to the type (the reception plan data 434 of FIG. 4). After the reception unit 415 receives the vehicle state signal VIS, various pieces of information included in the vehicle state signal VIS are temporarily stored in the buffer area 431.

The transmission unit 420 acquires the various pieces of information included in the vehicle state signal VIS from the buffer area 431 and transmits a vehicle state signal VISA to the ADS 202. The vehicle state signal VISA corresponds to the vehicle state signal VIS and is generated by the transmission unit 420 based on the vehicle state signal VIS. For example, the vehicle state signal VISA may be the same as the vehicle state signal VIS or may be generated using information extracted from the vehicle state signal VIS for a process executed in the ADS 202. The transmission unit 420 transmits the vehicle state signal VISA to the ADS 202 through the CAN communication line 300A according to the transmission plan data 435.

The VCIB 111 further includes label extraction units 423, 424, a reception cycle determination unit 425, and an index value calculation unit 437.

The functions of the label extraction units 423, 424 and the function of the reception cycle determination unit 425 are realized as the ECU 112 of the VCIB 111 and the communication device 113 operate in a collaborative manner. The function of the index value calculation unit 437 is realized as the ECU 112 executes a program stored in the memory of the VCIB 111.

The label extraction unit 423 extracts the label (FIG. 4) from the control request CR transmitted through the CAN communication line 300A. Similarly, the label extraction unit 424 extracts the label from the vehicle state signal VIS transmitted through the CAN communication line 350A. Each of the label extraction units 423, 424 outputs the extracted label to the index value calculation unit 437.

The reception cycle determination unit 425 determines the reception cycles of the control request CR and the vehicle state signal VIS. For example, the reception cycle determination unit 425 determines the start time and the end time of reception of the control request CR by the reception unit 405 according to a voltage level of the CAN communication line 300A. The reception cycle determination unit 425 determines, for each label (FIG. 4), the actual reception period of the control requests CR according to these start time and end time. The reception cycle determination unit 425 determines (calculates) the actual reception cycle of the control request CR based on a determination result of the reception periods of a plurality of control requests CR having the same label. The actual reception cycle of the control request CR is determined for each label of the control requests CR. The determination result is output to the index value calculation unit 437.

Similarly, the reception cycle determination unit 425 determines the start time and the end time of reception of the vehicle state signal VIS by the reception unit 415 according to a voltage level of the CAN communication line 350A and determines the reception period of the vehicle state signal VIS. The reception cycle determination unit 425 determines, for each label, the actual reception cycle of the vehicle state signal VIS based on the determination result of the reception period of the vehicle state signal VIS. This determination result is output to the index value calculation unit 437.

The index value calculation unit 437 calculates an index value IND showing the degree of congestion of CAN communication in the CAN communication lines 300A, 350A.

The index value IND includes a first communication delay time that is a delay time in communication from the ADS 202 to the base vehicle 100 through the VCIB 111. The first communication delay time includes a reception delay time of the control request CR and an internal processing delay time in the ECU 112 for the control request CR.

The index value IND also includes a second communication delay time that is a delay time in communication from the base vehicle 100 to the ADS 202 through the VCIB 111. The second communication delay time includes a reception delay time of the vehicle state signal VIS and an internal processing delay time in the ECU 112 for the vehicle state signal VIS.

In Embodiment 1, the delay time in communication between the ADS 202 and the base vehicle 100 is reflected on the index value IND as described above. As a result, the index value IND can be appropriately calculated.

The index value calculation unit 437 includes a reception delay calculation unit 440 and an internal processing delay calculation unit 445. The reception delay calculation unit 440 calculates a reception delay time included in each of the first communication delay time and the second communication delay time.

The index value calculation unit 437 calculates, for example, a reception delay time that occurs when the reception unit 405 receives the control request CR through the CAN communication line 300A. More specifically, for the control request CR, the reception delay calculation unit 440 calculates the reception delay time of the control request CR by subtracting the designed reception cycle from the actual reception cycle. This reception delay time may be calculated as an average value of reception delays of the control requests CR over a period having a specific length determined for each label of the control request CR. The reception delay calculation unit 440 acquires the reception cycle information DRC1 (FIG. 4) showing the designed reception cycle of the control request CR from the reception plan data 432. The reception delay calculation unit 440 receives the actual reception cycle of the control request CR from the reception cycle determination unit 425.

Similarly, the index value calculation unit 437 calculates a reception delay time that occurs when the reception unit 415 receives the vehicle state signal VIS through the CAN communication line 350A. More specifically, for the vehicle state signal VIS, the reception delay calculation unit 440 calculates the reception delay time of the vehicle state signal VIS by subtracting the designed reception cycle from the actual reception cycle. This reception delay time may be calculated as an average value of reception delays of the vehicle state signals VIS over a period having a specific length determined for each label of the vehicle state signal VIS. The reception delay calculation unit 440 acquires the reception cycle information DRC2 (FIG. 4) showing the designed reception cycle of the vehicle state signal VIS from the reception plan data 434. The reception delay calculation unit 440 receives the actual reception cycle of the vehicle state signal VIS from the reception cycle determination unit 425.

The internal processing delay calculation unit 445 calculates an internal processing delay time that is a delay time that occurs in processing inside the ECU 112 of the VCIB 111. The internal processing delay time included in the first communication delay time is a processing delay time that occurs in processing during a period from when the reception unit 405 receives the control request CR until when the transmission unit 410 transmits the control instruction CC. The internal processing delay time included in the second communication delay time is a processing delay time that occurs in processing during a period from when the reception unit 415 receives the vehicle state signal VIS until when the transmission unit 420 transmits the vehicle state signal VISA.

The internal processing delay time includes an execution time of processing by the ECU 112 and a transmission waiting time taken for a transmission waiting process aimed at communicational mediation in CAN communication. The transmission waiting time corresponds to the time of offset (FIG. 4).

The execution time of processing by the ECU 112 is determined according to the performance of the processor included in the ECU 112 and the data size (FIG. 4) of the CAN signal (specifically, the control request CR, the control instruction CC, the vehicle state signal VIS, or the vehicle state signal VISA) processed by the ECU 112. Information showing the performance of the processor is stored in the storage unit 430 beforehand.

The internal processing delay calculation unit 445 calculates (acquires) the transmission waiting time according to the transmission plan data 433, 435. Specifically, the internal processing delay calculation unit 445 calculates the transmission waiting time according to the offset information OI1, OI2 (FIG. 4) and the label output from the label extraction units 423, 424.

The index value calculation unit 437 calculates the index value IND according to the reception delay time of the control request CR or the vehicle state signal VIS and the internal processing delay time in the ECU 112. Specifically, the index value calculation unit 437 calculates, for each control request CR, a total of the reception delay time of the control request CR and the internal processing delay time in the ECU 112 for the control request CR as a total delay time. Similarly, the index value calculation unit 437 calculates, for each vehicle state signal VIS, a total of the reception delay time of the vehicle state signal VIS and the internal processing delay time in the ECU 112 for the vehicle state signal VIS as a total delay time.

The index value calculation unit 437 calculates an average of the total delay times calculated for the respective control requests CR as a first index value IND1 and calculates an average of the total delay times calculated for the respective vehicle state signals VIS as a second index value IND2. The first index value IND1 corresponds to the first communication delay time. The second index value IND2 corresponds to the second communication delay time. Each of the first index value IND1 and the second index value IND2 is output to the transmission unit 420 and then transmitted to the ADS 202.

Each of these index values IND, when equal to or larger than a threshold value, shows that communication relating to that index value IND is congested. The threshold value is determined beforehand as appropriate by prior testing.

For example, when the first index value IND1 is equal to or larger than the threshold value, communication from the ADS 202 to the base vehicle 100 through the VCIB 111 is so congested that the transmission delay of the control request CR and the control instruction CC is practically unignorable.

Similarly, when the second index value IND2 is equal to or larger than the threshold value, communication from the base vehicle 100 to the ADS 202 through the VCIB 111 is so congested that the transmission delay of the vehicle state signal VIS and the vehicle state signal VISA is practically unignorable.

On the other hand, each of the index values IND, when smaller than the threshold value, shows that communication relating to that index value IND is not congested.

For example, when the first index value IND1 is smaller than the threshold value, communication from the ADS 202 to the base vehicle 100 through the VCIB 111 is not congested. Therefore, no transmission delay of the control request CR and the control instruction CC occurs or the delay is negligibly small from a practical perspective.

Similarly, when the second index value IND2 is smaller than the threshold value, communication from the base vehicle 100 to the ADS 202 through the VCIB 111 is not congested. Therefore, no transmission delay of the vehicle state signal VIS and the vehicle state signal VISA occur or the delay is negligibly small from a practical perspective.

Figure 6:
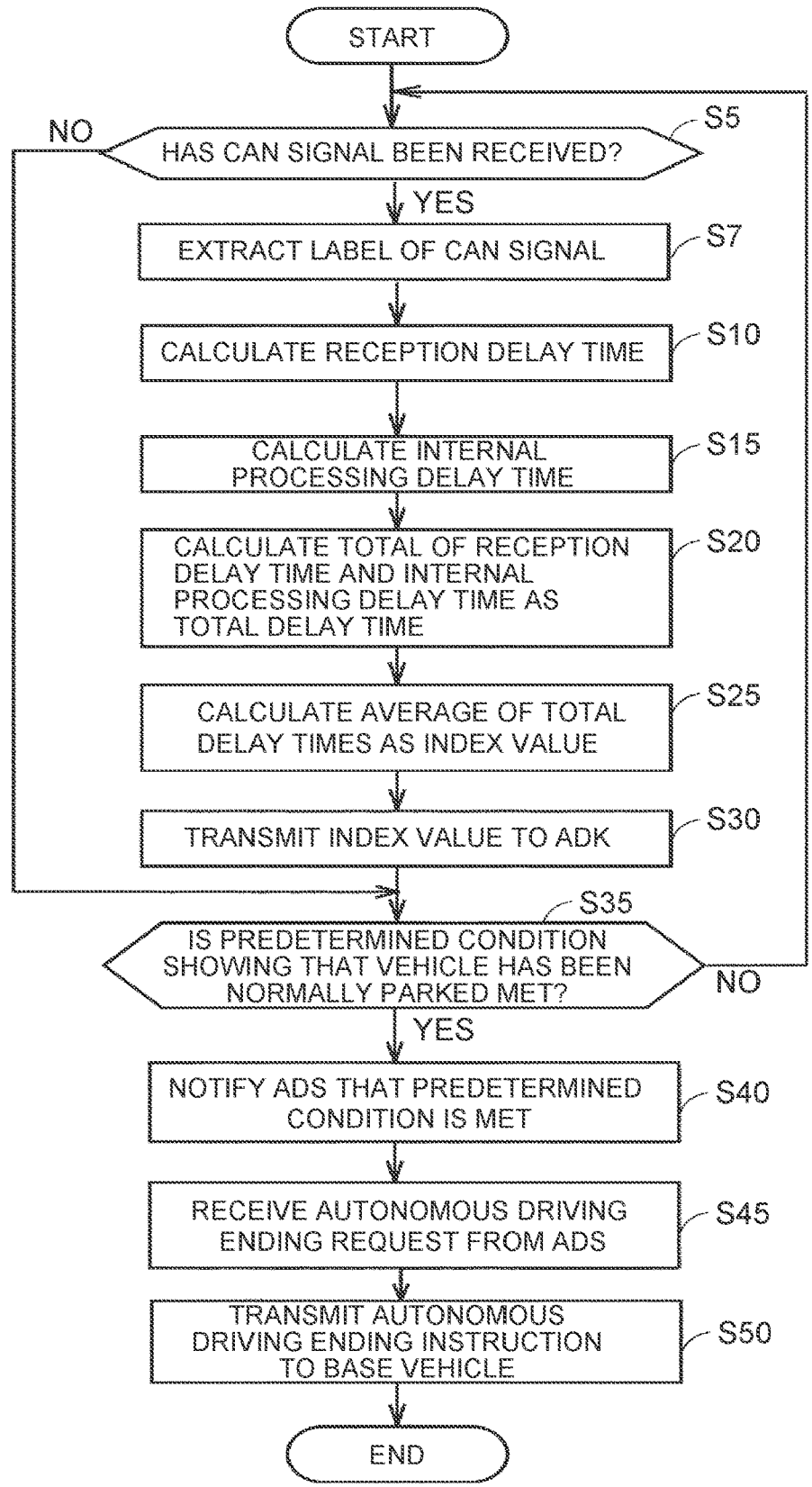
FIG. 6 is a flowchart showing one example of processes executed by the VCIB.

FIG. 6 is a flowchart showing one example of processes executed by the VCIB 111. The process of this flowchart is started when the mode of the vehicle 10 (base vehicle 100) is switched from the manual mode to the autonomous driving mode by the user's operation using the HMI 230.

Referring to FIG. 6, the VCIB 111 determines whether a CAN signal has been received from the ADS 202 or the base vehicle 100 (step S5). Specifically, the VCIB 111 determines whether a control request CR from the ADS 202 or a vehicle state signal VIS from the base vehicle 100 has been received.

When a CAN signal has not been received (NO in step S5), the VCIB 111 moves the process to step S35. On the other hand, when a CAN signal has been received (YES in step S5), the VCIB 111 moves the process to step S7. When a plurality of CAN signals has been received in step S5, the VCIB 111 executes the processes of step S7 to step S20 for each of the received CAN signals.

Next, the VCIB 111 extracts the label (FIG. 4) of the received CAN signal (step S7). Specifically, the VCIB 111 extracts the label of the control request CR or extracts the label of the vehicle state signal VIS.

Next, the VCIB 111 calculates the reception delay time of the CAN signal (the control request CR or the vehicle state signal VIS) by subtracting the designed reception cycle of the CAN signal from the actual reception cycle thereof (step S10). Specifically, the VCIB 111 acquires the designed reception cycle of the CAN signal using the extracted label and the reception plan data 432, 434. For example, the VCIB 111 calculates the reception delay time of the control request CR by subtracting the designed reception cycle of the control request CR from the actual reception cycle thereof. Or the VCIB 111 calculates the reception delay time of the vehicle state signal VIS by subtracting the designed reception cycle of the vehicle state signal VIS from the actual reception cycle thereof.

Next, the VCIB 111 calculates the internal processing delay time in the ECU 112 for the CAN signal (step S15). Specifically, using the extracted label, the VCIB 111 acquires the data size of the CAN signal according to the transmission plan data 433, 435. The VCIB 111 calculates the execution time of processing by the ECU 112 for the CAN signal according to the acquired data size. Further, using the extracted label, the VCIB 111 calculates the transmission waiting time of the CAN signal. Then, the VCIB 111 calculates a total of the execution time of processing by the ECU 112 and the transmission waiting time as the internal processing delay time.

Next, the VCIB 111 calculates a total of the reception delay time and the internal processing delay time as a total delay time (step S20). For example, the VCIB 111 calculates the total delay time for each control request CR or calculates the total delay time for each vehicle state signal VIS.

Next, the VCIB 111 calculates an average of the total delay times as the index value IND (step S25). For example, the VCIB 111 calculates an average of the total delay times for a plurality of control requests CR as the first index value IND1 or calculates an average of total delay times for a plurality of vehicle state signals VIS as the second index value IND2.

Next, the VCIB 111 transmits the index value IND to the ADS 202 (step S30). For example, the VCIB 111 transmits the first index value IND1 and the second index value IND2 to the ADS 202.

Next, the VCIB 111 determines whether a predetermined condition showing that the base vehicle 100 has stopped normally is met (step S35). This predetermined condition is, for example, that the base vehicle 100 is parked in an area inside demarcation lines in a parking lot. Whether the base vehicle 100 has been parked in this area is determined by a commonly known image processing technique using an image taken by the camera of the active safety system 125 of the base vehicle 100. The VCIB 111 executes the determination process of step S35 according to the vehicle state signal VIS including information on this image.

When the predetermined condition is not met (NO in step S35), the base vehicle 100 is still traveling on the road in the autonomous driving mode. In this case, the VCIB 111 returns the process to step S5. On the other hand, when the predetermined condition is met (YES in step S35), the VCIB 111 notifies the ADS 202 that the predetermined condition is met by means of a vehicle state signal VISA (step S40). Thereafter, the ADS 202 transmits an autonomous driving end request for the base vehicle 100 as a control request CR to the VCIB 111 through the communication module 209 (FIG. 2).

Next, the VCIB 111 receives, from the ADS 202, the autonomous driving end request for the base vehicle 100 as a control request CR (step S45).

Next, in response to the reception of the autonomous driving end request, the VCIB 111 transmits an autonomous driving end instruction to the base vehicle 100 as a control instruction CC (step S50). Thus, the mode of the vehicle 10 switches from the autonomous driving mode to the manual mode, and the process of FIG. 6 ends.

As has been described above, the VCIB 111 according to Embodiment 1 includes the reception unit 405, the index value calculation unit 437, and the transmission unit 420. The reception unit 405 receives a control request CR for the base vehicle 100 from the ADS 202. The index value calculation unit 437 calculates the index value IND showing the degree of congestion of CAN communication. The transmission unit 420 transmits the index value IND to the ADS 202.

By this configuration, the index value IND is transmitted to the ADS 202. Thus, the degree of congestion of CAN communication can be notified to the ADS 202. Therefore, after notification to the ADS 202, the degree of congestion of CAN communication between the ADS 202 and the base vehicle 100 can be reduced. As a result, autonomous driving of the base vehicle 100 can be appropriately executed according to control requests CR from the ADS 202.

Embodiment 2

As described above, the ADS 202 is configured to reduce the degree of congestion in the CAN communication line 300 when CAN communication is congested (e.g., when the index value IND is larger than the threshold value).

In Embodiment 2, a process that the computer 210 of the ADS 202 (more specifically, the processor 207 of FIG. 2) executes upon receiving the index value IND from the VCIB 111 through the communication module 209 will be described. Specifically, the computer 210 sets a transmission plan of control requests CR according to the degrees of priority (FIG. 3) of the control requests CR in CAN communication and the index value IND.

By this configuration, the control requests CR are appropriately transmitted from the ADS 202 to the VCIB 111. (This will be described in detail later.) Thus, the degree of congestion of CAN communication in the CAN communication line 300 is reduced. As a result, autonomous driving of the base vehicle 100 can be appropriately executed according to the control requests CR.

In the above description, setting the transmission plan of the control requests CR according to the index value IND means setting the transmission plan according to at least one of the first index value IND1 and the second index value IND2. For example, the case where the index value IND is equal to or larger than the threshold value may be either the case where one of the first index value IND1 and the second index value IND2 is equal to or larger than the threshold value, or the case where both of the first index value IND1 and the second index value IND2 are equal to or larger than the threshold value.

Before a detailed description of the process by the ADS 202 according to Embodiment 2, a comparative example of a case where the process by the ADS 202 to be described later is not executed will be described.

Figure 7:
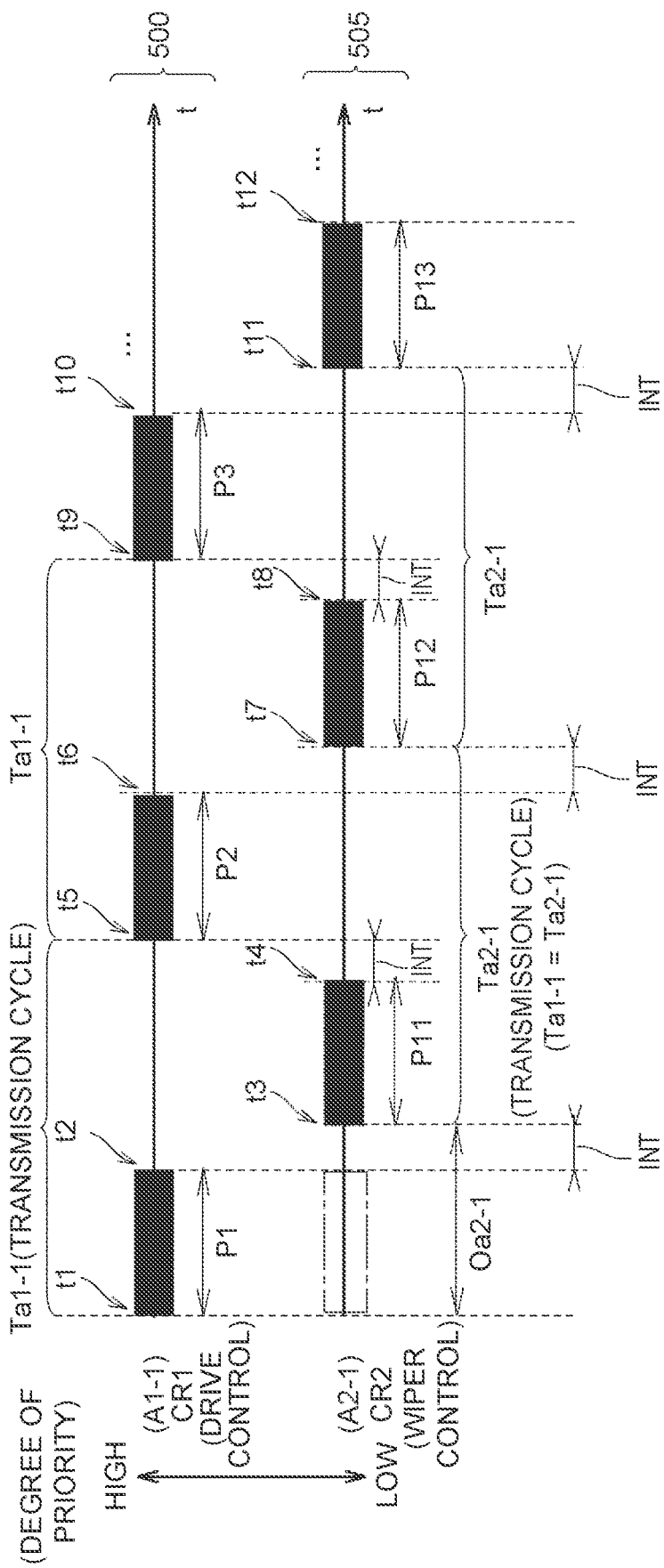
FIG. 7 is a chart illustrating timings of transmission of control requests from the ADS to the VCIB in a comparative example.

FIG. 7 is a chart illustrating timings of transmission of control requests CR from the ADS to the VCIB 111 in the comparative example.

Referring to FIG. 7, the timing chart 500 shows timings of transmission of control requests CR having a relatively high degree of priority (in other words, control requests CR classified into the first group). In this example, as one example of such control requests CR, a control request CR1 for drive control of the base vehicle 100 is shown.

The timing chart 505 shows timings of transmission of control requests CR having a relatively low degree of priority (in other words, control requests CR classified into the second group). In this example, as one example of such control requests CR, a control request CR2 for wiper control of the base vehicle 100 is shown.

The ADS of the comparative example sets the transmission timings (more specifically, the transmission cycles and the offsets) of the control requests CR1, CR2 regardless of the index value IND as follows. In this example, it is assumed that both the control requests CR1, CR2 are stored in the transmission buffer area 231 of the ADS 202 immediately before time t1.

At time t1, transmission of the control request CR1 is started with priority. That is, since the degree of priority of the control request CR1 is higher than the degree of priority of the control request CR2, the control request CR1 is output from the transmission buffer area 231 to the VCIB 111 with priority over the control request CR2. Meanwhile, the control request CR2 is not transmitted during a period P1 from time t1 to time t2 (the period indicated by the dashed lines), and is thus offset. In the comparative example, the amount of offset is Oa2-1 (FIG. 3).

The ADS starts to transmit the control request CR1 at time t1 and then ends the transmission at time t2. Subsequently, transmission of the control request CR1 is repeated in the transmission cycle of Ta1-1 (e.g., a period P2 from time t5 to time t6 and a period P3 from time t9 to time t10).

At time t3 after time t2, the ADS starts to transmit the control request CR2. Thereafter, the ADS executes transmission of the control request CR2 during a period P11 from time t3 to time t4. Subsequently, transmission of the control request CR2 is repeated in the transmission cycle of Ta2-1 (in this example, equal to Ta1-1) (e.g., a period P12 from time t7 to time t8 and a period P13 from time t11 to time t12).

In this comparative example, a time interval INT from the end to the start of transmission of the CAN signals (the control requests CR1, CR2) by the ADS is related to a time interval from the end to the start of reception of the CAN signals by the VCIB. Therefore, when CAN signals are so incessantly output from the ADS (the time interval INT is so short) that the VCIB 111 cannot adequately execute the reception process of the CAN signals, a reception delay of the control requests CR1, CR2 may occur. As a result, in autonomous driving, relatively important vehicle control, such as drive control of the base vehicle 100, may be delayed.

Figure 8:
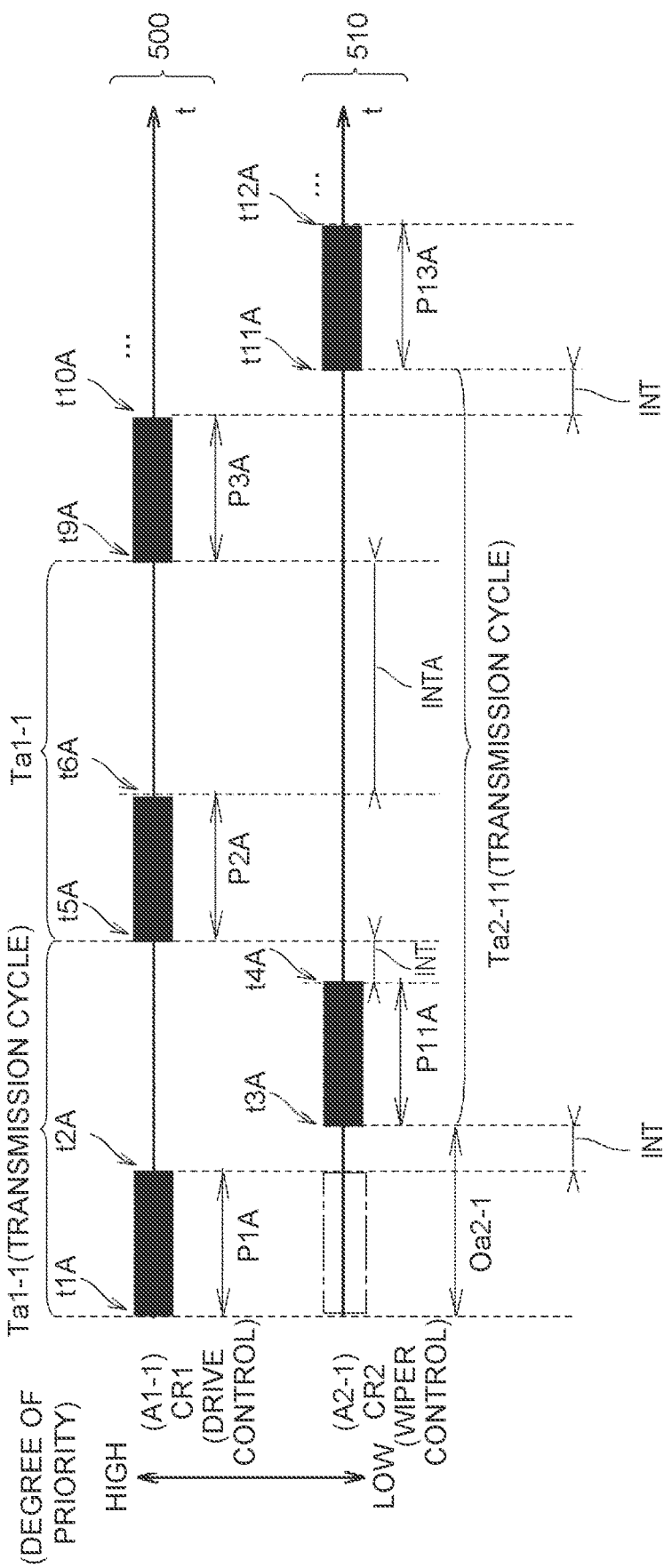
FIG. 8 is a chart illustrating one example of timings of transmission of control requests from the ADS to the VCIB in Embodiment 2.

FIG. 8 is a chart illustrating one example of timings of transmission of control requests CR from the ADS 202 to the VCIB 111 in Embodiment 2.

Referring to FIG. 8, time t1A to time t6A correspond to time t1 to time t6 (FIG. 7), respectively. Time t9A to time t12A correspond to time t9 to time t12, respectively. Periods P1A, P2A, P3A, P11A, P13A correspond to the periods P1, P2, P3, P11, P13, respectively.

The timing chart 500 is the same as that of FIG. 7. The timing chart 510 is the same as the timing chart 505 (FIG. 7) in that it shows transmission timings of the control request CR2. On the other hand, the timing chart 510 is different from the timing chart 505 in that the transmission cycle of the control request CR2 is set (changed) to Ta2-11 (≠Ta2-1).

The ADS 202 sets the transmission timings of the control requests CR1, CR2 according to the index value IND and the degrees of priority of the control requests CR1, CR2. In this example, it is assumed that both the control requests CR1, CR2 are stored in the transmission buffer area 231 of the ADS 202 immediately before time t1A. Further, it is assumed that the index value IND has exceeded the threshold value immediately before time t1A. It is assumed that the transmission cycle of the control request CR2 before the index value IND exceeds the threshold value is Ta2-1 (FIG. 3, FIG. 7).

As in the comparative example, the control request CR1 is output from the transmission buffer area 231 to the VCIB 111 with priority during the period P1A, while the control request CR2 is offset. Then, the control request CR2 is output from the transmission buffer area 231 to the VCIB 111 during the period P11A.

In Embodiment 2, since the index value IND is equal to or larger than the threshold value after time t1A, the ADS 202 changes the transmission cycle of the control request CR2 from Ta2-1 to Ta2-11 (>Ta2-1). More specifically, the ADS 202 rewrites the transmission plan data 212 (FIG. 3) such that the transmission cycle of the control request CR1 is maintained at Ta1-1 and that the transmission cycle of the control request CR2 is changed from Ta2-1 to Ta2-11 (>Ta2-1). Therefore, after the period P11A, the control request CR2 is not transmitted from the ADS 202 until the time t11A (period P13A) comes.

Thus, no CAN signals are transmitted throughout a time interval INTA (>INT) from the end of transmission of the control request CR1 to the start of transmission of the next control request CR1. Therefore, a situation can be avoided where CAN signals are incessantly output from the ADS 202 to the VCIB 111 through the CAN communication line 300. As a result, reception delays of the control requests CR1, CR2 due to the VCIB 111 being unable to adequately execute the reception process of CAN signals can be avoided.

From another perspective, extending the transmission cycle of the control request CR2 results in a decrease in the transmission frequency of the control request CR2. Accordingly, congestion of the CAN communication line 300 is reduced, so that congestion of communication from the ADS 202 to the base vehicle 100 through the VCIB 111 is reduced.

As has been described above, the ADS 202 sets the transmission plan of control requests CR such that the transmission cycle of a control request classified into the second group (the group having a relatively low degree of priority) becomes longer when the index value IND is high than when the index value IND is low. This configuration makes it possible to continue the transmission of the control request CR1 having a high degree of priority as before CAN communication becomes congested while temporarily postponing the transmission of the control request CR2 having a low degree of priority. As a result, a situation can be avoided where important vehicle control in autonomous driving, such as drive control of the base vehicle 100, is delayed.

Figure 9:
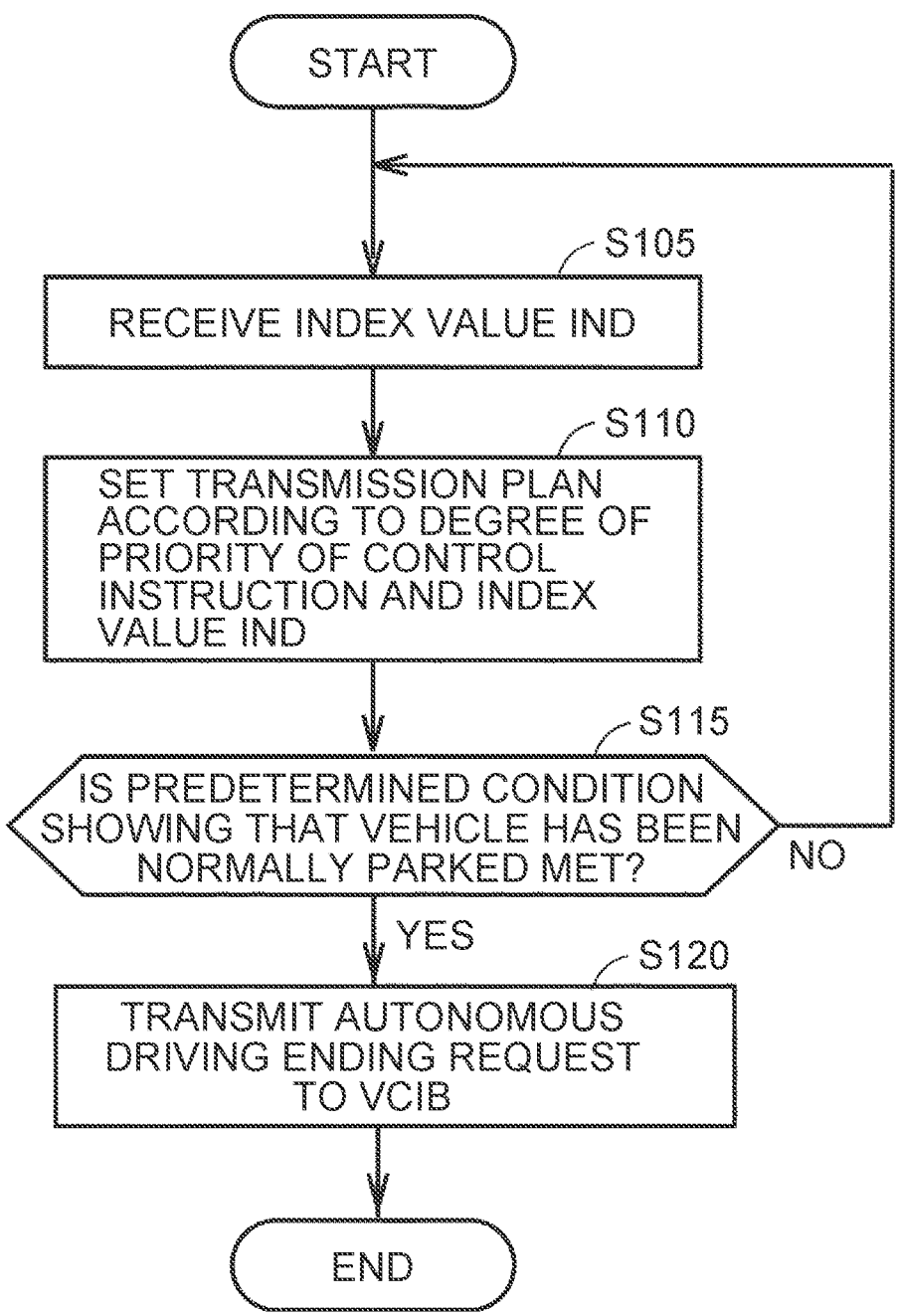
FIG. 9 is a flowchart showing one example of processes executed by a computer of the ADS according to Embodiment 2.

FIG. 9 is a flowchart showing one example of processes executed by the computer 210 of the ADS 202 according to Embodiment 2. The process of this flowchart is started when the user's operation for switching the mode of the vehicle 10 (base vehicle 100) from the manual mode to the autonomous driving mode is performed using the HMI 230.

Referring to FIG. 9, the ADS 202 receives the index value IND (in this example, the first index value IND1 and the second index value IND2) from the VCIB 111 through the CAN communication line 300 (step S105).

Next, the ADS 202 sets the transmission plan of control requests CR according to the degrees of priority (FIG. 3) of the control requests CR in CAN communication and the index value IND (step S110). For example, when the index value IND is equal to or larger than the threshold value, the ADS 202 sets (changes) the transmission plan of the control requests CR such that congestion of the CAN communication line 300 is reduced. Specifically, as in the example of FIG. 8, the ADS 202 rewrites the transmission plan data 212 such that the transmission cycle of a control request CR having a relatively low degree of priority (e.g., the control request CR2 for wiper control of the base vehicle 100) is extended.

Next, the ADS 202 determines whether the predetermined condition showing that the base vehicle 100 has stopped normally is met (step S115). Specifically, the ADS 202 determines whether a notification showing that this predetermined condition is met has been received from the VCIB 111. When the predetermined condition is not met (NO in step S115), the ADS 202 returns the process to step S105. On the other hand, when the predetermined condition is met (YES in step S115), the ADS 202 moves the process to step S120.

Next, the ADS 202 transmits an autonomous driving end request for the base vehicle 100 as a control request CR to the VCIB 111. Thereafter, the process of FIG. 9 ends.

In the series of processes described above, when the ADS 202 has rewritten the transmission plan data 212 in step 110, the ADS 202 may restore the transmission plan data 212 to the data before rewriting after the process of step 115 and before the process of step 120.

Modified Example of Embodiment 2

The ADS 202 may set the transmission plan such that the transmission waiting time (offset) of the control request CR2 in CAN communication becomes longer when the index value IND is high than when the index value IND is low.

Figure 10:
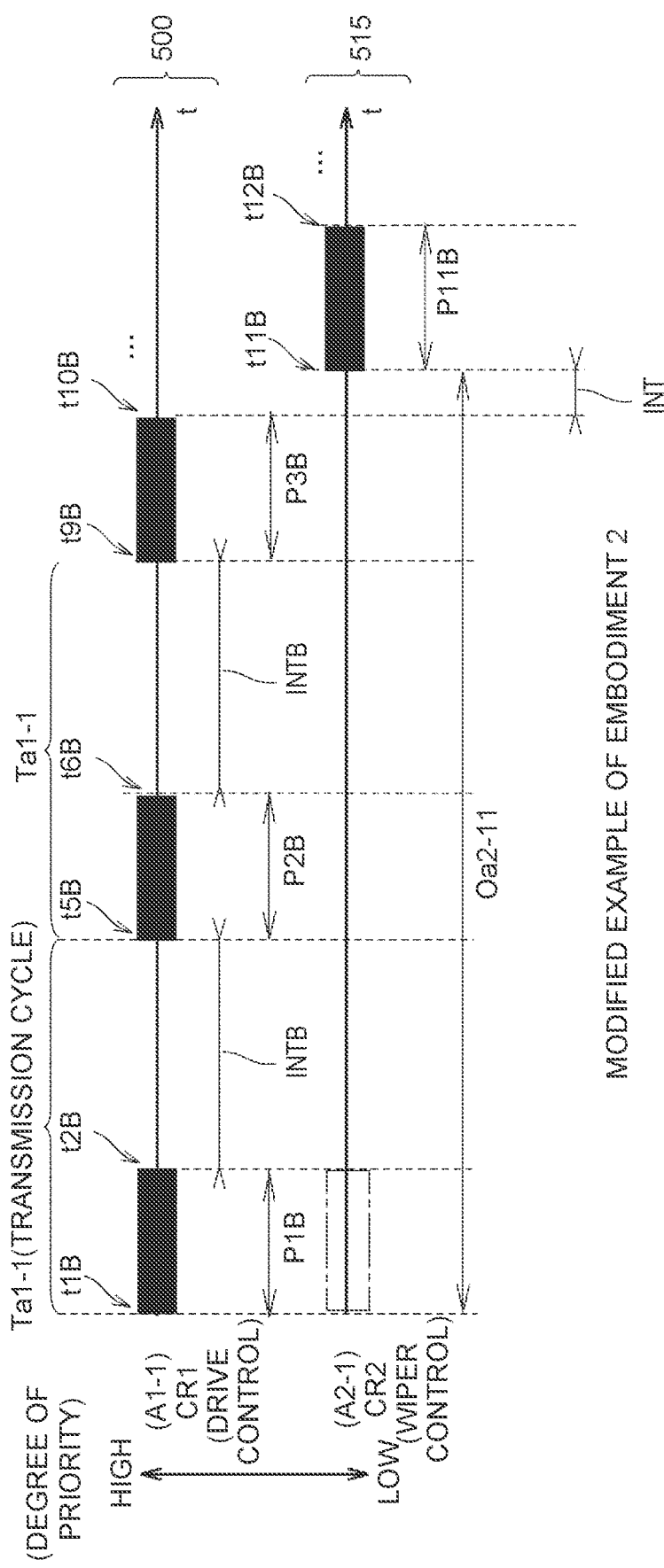
FIG. 10 is a chart illustrating another example of timings of transmission of control requests from the ADS to the VCIB in a modified example.

FIG. 10 is a chart illustrating another example of timings of transmission of control requests CR from the ADS 202 to the VCIB 111 in this modified example.

Referring to FIG. 10, times t1B, t2B, t5B, t6B, t9B to t12B correspond to times t1, t2, t5, t6, t9 to t12 (FIG. 7), respectively. Periods P1B, P2B, P3B, P11B correspond to the periods P1, P2, P3, P11, respectively.

The timing chart 500 is the same as that of FIG. 7. The timing chart 515 is the same as the timing chart 505 (FIG. 7) in that it shows transmission timings of the control request CR2. On the other hand, the timing chart 515 is different from the timing chart 505 in that the offset of the control request CR2 is set (changed) to Oa2-11 (≠Oa2-1).

The ADS 202 sets the transmission plan of the control requests CR such that the period P11B that is a transmission period of the control request CR2 does not overlap with the periods P1B, P2B, P3B that are transmission periods of the control request CR1. In this example, it is assumed that both the control requests CR1, CR2 are stored in the transmission buffer area 231 of the ADS 202 immediately before time t1B. Further, it is assumed that the index value IND has exceeded the threshold value immediately before time t1B. It is assumed that the offset of the control request CR2 before the index value IND exceeds the threshold value is Oa2-1 (FIG. 3, FIG. 7).

In response to the index value IND having exceeded the threshold value, the ADS 202 changes the offset of the control request CR2 from Oa2-1 to Oa2-11 (>Oa2-1). More specifically, the ADS 202 rewrites the transmission plan data 212 (FIG. 3) such that the offset of the control request CR2 is changed from Oa2-1 to Oa2-11.

As in the comparative example (FIG. 7), the control request CR1 is output from the transmission buffer area 231 to the VCIB 111 with priority during the period P1B, while the control request CR2 is offset. In this modified example, since the offset is changed to Oa2-11, the control request CR2 is not transmitted from the ADS 202 after the period P1B until time t11B (period P11B) comes.

Thus, no CAN signals are transmitted throughout a time interval INTB (>INT) between the period P1B and the period P2B and a time interval INTB (>INT) between the period P2B and the period P3B. As a result, the degree of congestion of the CAN communication line 300 is reduced (congestion is eliminated), so that the degree of congestion of communication from the ADS 202 to the base vehicle 100 through the VCIB 111 is reduced. Therefore, as in the case of Embodiment 2, it is possible to continue the transmission of the control request CR1 having a high degree of priority as before CAN communication becomes congested while temporarily postponing the transmission of the control request CR2 having a low degree of priority.

Another Modified Example of Embodiments 1 and 2

In Embodiments 1 and 2 described above, the first index value IND1 is an average value of total delay times calculated for the respective control requests CR. Alternatively, the first index value IND1 may be a discrete value that is calculated by the VCIB 111 according to this average value. For example, the first index value IND1 may be 1 when the average value is equal to or larger than a threshold value (when CAN communication is congested), and may be 0 when the average value is smaller than the threshold value (when CAN communication is not congested).

Similarly, the second index value IND2 may be a discrete value that is calculated according to an average value of total delay times calculated for the respective vehicle state signals VIS. For example, the second index value IND2 may be 1 when the average value is equal to or larger than a threshold value and may be 0 when the average value is smaller than the threshold value.

Also in this modified example, the degree of congestion of CAN communication (more specifically, whether CAN communication is congested) can be notified from the VCIB 111 to the ADS 202.

Other Modified Examples

CAN signals that are classified into the first group having a high degree of priority may be, other than the signal for drive control of the base vehicle 100, for example, signals used for steering control, collision detection, stop holding control, power source control, control for safety features, and control of abnormality notification of the base vehicle 100.

CAN signals that are classified into the second group having a low degree of priority may be, other than the signal for wiper control of the base vehicle 100, for example, signals used for control of interior lights, air conditioner control, and window control of the base vehicle 100.

Additional Statement 1

The first reception unit is configured to receive a plurality of control requests, the calculation unit calculates a total of the reception delay time and the processing delay time for each of the control requests, and the calculation unit calculates, as the index value, a first average value that is an average value of the totals calculated for the respective control requests.

Additional Statement 2

The second reception unit is configured to receive a plurality of vehicle state signals, the calculation unit calculates a total of the reception delay time and the processing delay time for each of the vehicle state signals, and the calculation unit calculates, as the index value, a second average value that is an average value of the totals calculated for the respective vehicle state signals.

The embodiments disclosed this time should be construed as being in every respect merely illustrative and not restrictive. The scope of the present disclosure is shown not by the above description but by the claims, and is intended to include all changes equivalent in meaning and scope to the claims.

What is claimed is:

1. A vehicle platform configured such that an autonomous driving system is installable in the vehicle platform, the vehicle platform comprising:
   a vehicle; and
   a vehicle control interface box that acts as an interface between the vehicle and the autonomous driving system installed in the vehicle by CAN communication, wherein:
   the vehicle control interface box includes a processor configured to:
   receive a control request for the vehicle from the autonomous driving system;
   calculate an index value showing a degree of congestion of the CAN communication; and
   transmit the index value to the autonomous driving system; and
   the index value includes:
   a first communication delay time that is a delay time in communication from the autonomous driving system to the vehicle through the vehicle control interface box; and
   a second communication delay time that is a delay time in communication from the vehicle to the autonomous driving system through the vehicle control interface box.

2. The vehicle platform according to claim 1, wherein:
   communication lines in which the CAN communication is performed include a first communication line that connects the autonomous driving system and the vehicle control interface box to each other;
   the processor is configured to transmit a control instruction for the vehicle generated based on the control request to the vehicle; and
   the first communication delay time includes:
   a reception delay time that occurs when the processor receives the control request through the first communication line; and
   a processing delay time that occurs in processing during a period from when the processor receives the control request until when the processor transmits the control instruction.

3. The vehicle platform according to claim 1, wherein:
   communication lines in which the CAN communication is performed include a second communication line that connects the vehicle control interface box and the vehicle to each other;
   the processor is configured to receive a vehicle state signal showing a state of the vehicle from the vehicle;
   when the processor receives the vehicle state signal, the processor is configured to transmit a signal generated based on the vehicle state signal to the autonomous driving system; and
   the second communication delay time includes:
   a reception delay time that occurs when the processor receives the vehicle state signal through the second communication line; and
   a processing delay time that occurs in processing during a period from when the processor receives the vehicle state signal until when the processor transmits a signal generated based on the vehicle state signal.

4. A vehicle control interface box that acts as an interface between a vehicle platform and an autonomous driving system installed in the vehicle platform by CAN communication, the vehicle platform including a vehicle,
   the vehicle control interface box comprising a processor configured to:
   receive a control request for the vehicle from the autonomous driving system;
   calculate an index value showing a degree of congestion the CAN communication; and
   transmit the index value to the autonomous driving system, wherein the index value includes:
   a first communication delay time that is a delay time in communication from the autonomous driving system to the vehicle through the vehicle control interface box; and
   a second communication delay time that is a delay time in communication from the vehicle to the autonomous driving system through the vehicle control interface box.

5. The vehicle control interface box according to claim 4, wherein:
   communication lines in which the CAN communication is performed include a first communication line that connects the autonomous driving system and the vehicle control interface box to each other;
   the processor is configured to transmit a control instruction for the vehicle generated based on the control request to the vehicle; and
   the first communication delay time includes:
   a reception delay time that occurs when the processor receives the control request through the first communication line; and a processing delay time that occurs in processing during a period from when the processor receives the control request until when the processor transmits the control instruction.

6. The vehicle control interface box according to claim 4, wherein:
communication lines in which the CAN communication is performed include a second communication line that connects the vehicle control interface box and the vehicle to each other;
the processor is configured to receive a vehicle state signal showing a state of the vehicle from the vehicle through the second communication line;
when the processor receives the vehicle state signal, the processor is configured to transmit a signal generated based on the vehicle state signal to the autonomous driving system; and
the second communication delay time includes:
a reception delay time that occurs when the processor receives the vehicle state signal; and
a processing delay time that occurs in processing during a period from when the processor receives the vehicle state signal until when the processor transmits a signal generated based on the vehicle state signal.

7. An autonomous driving system configured to be installable in a vehicle platform, the vehicle platform including:
a vehicle; and
a vehicle control interface box that acts as an interface between the vehicle and
the autonomous driving system installed in the vehicle by CAN communication, the autonomous driving system comprising:
a computer; and
a communication module that includes a processor configured to perform communication with the vehicle control interface box by the CAN communication, wherein:
the computer is programmed to receive an index value showing a degree of congestion of the CAN communication from the vehicle control interface box through the communication module;
the computer is programmed to transmit control requests for the vehicle to the vehicle control interface box through the communication module; and
the computer is programmed to set a transmission plan of the control requests according to degrees of priority of the control requests in the CAN communication and the index value.

8. The autonomous driving system according to claim 7, wherein:
the control requests are classified into a plurality of groups according to the degree of priority;
the plurality of groups includes a first group of which the degree of priority is high and a second group of which the degree of priority is lower than that of the first group; and
the computer sets the transmission plan such that a transmission cycle of a control request classified into the second group becomes longer when the index value is high than when the index value is low.

9. The autonomous driving system according to claim 7, wherein:
the control requests are classified into a plurality of groups according to the degree of priority;
the plurality of groups includes a first group of which the degree of priority is high and a second group of which the degree of priority is lower than that of the first group;
the computer sets a transmission waiting time of the control request classified into the second group such that a transmission period of the control request classified into the second group does not overlap with a transmission period of the control request classified into the first group; and
the computer sets the transmission plan such that the transmission waiting time becomes longer when the index value is high than when the index value is low.

* * * * *